United States Patent
Umesaki et al.

(10) Patent No.: US 7,162,726 B2
(45) Date of Patent: Jan. 9, 2007

(54) DISK APPARATUS

(75) Inventors: Kiyoshi Umesaki, Osaka (JP);
Yoshikazu Yamano, Osaka (JP);
Kiyonari Saruwatari, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 340 days.

(21) Appl. No.: 10/896,592

(22) Filed: Jul. 22, 2004

(65) Prior Publication Data

US 2005/0005278 A1 Jan. 6, 2005

Related U.S. Application Data

(62) Division of application No. 09/486,880, filed as application No. PCT/JP99/03564 on Jul. 1, 1999, now Pat. No. 6,782,547.

(30) Foreign Application Priority Data

| Jul. 2, 1998 | (JP) | ................................. 10-187265 |
| Jul. 2, 1998 | (JP) | ................................. 10-187276 |
| Jul. 2, 1998 | (JP) | ................................. 10-187277 |

(51) Int. Cl.
*G11B 7/08* (2006.01)

(52) U.S. Cl. .................................... 720/674

(58) Field of Classification Search ................. 720/674
See application file for complete search history.

(56) References Cited

U.S. PATENT DOCUMENTS

| 4,646,176 A | * | 2/1987 | Shimaoka et al. | ........ | 360/99.06 |
| 5,311,497 A | * | 5/1994 | Takizawa et al. | ........... | 720/668 |
| 5,313,446 A | * | 5/1994 | Tokano et al. | .............. | 369/111 |
| 5,381,393 A | * | 1/1995 | Ohtani | ........................ | 720/604 |
| 5,539,717 A | * | 7/1996 | Choi | ........................... | 720/656 |
| 5,559,649 A | * | 9/1996 | Ito et al. | ................... | 360/99.06 |
| 5,590,113 A | * | 12/1996 | Choi | ........................... | 720/713 |

(Continued)

FOREIGN PATENT DOCUMENTS

JP         62-293558         12/1987

(Continued)

OTHER PUBLICATIONS

International Search Report dated Oct. 26, 1999 for PCT/JP99/03564.

*Primary Examiner*—Tianjie Chen
(74) *Attorney, Agent, or Firm*—RatnerPrestia

(57) ABSTRACT

A disk apparatus of the present invention, in which a cartridge accommodating a disk-like recording medium and having an opening opened or closed by a shutter member is loaded to the disk apparatus, includes a loading chassis; a cartridge transporting member provided on the loading chassis for transporting the cartridge from a removal position to a play position; a traverse unit for carrying a pickup for recording or reproducing a signal onto or from the disk-like recording medium; a traverse transporting member provided on the loading chassis for transporting the traverse unit from a standby position to the play position; and a driving section provided on the loading chassis for driving the cartridge transporting member and the traverse transporting member. The cartridge transporting member and the traverse transporting member can slide in a direction of transporting the cartridge. One of the cartridge transporting member and the traverse transporting member is disposed on the other. In loading the cartridge, the driving section starts to drive only the cartridge transporting member before the cartridge transporting member drives the traverse transporting member; and the cartridge reaches the play position before the driving section drives only the traverse transporting member.

5 Claims, 40 Drawing Sheets

U.S. PATENT DOCUMENTS

| | | | |
|---|---|---|---|
| 5,796,698 A | * | 8/1998 | Ookawa et al. ............ 720/689 |
| 6,215,752 B1 | * | 4/2001 | Kabasawa .................. 720/644 |
| 6,385,155 B1 | * | 5/2002 | Ichikawa et al. ........... 720/641 |

FOREIGN PATENT DOCUMENTS

| | | |
|---|---|---|
| JP | 63-37855 | 2/1988 |
| JP | 1-133310 | 9/1989 |
| JP | 5-1006 | 1/1993 |
| JP | 5-81815 | 4/1993 |
| JP | 6-111447 | 4/1994 |
| JP | 7-43268 | 8/1995 |
| JP | 8-45159 | 2/1996 |
| JP | 10021660 A | 1/1998 |

* cited by examiner

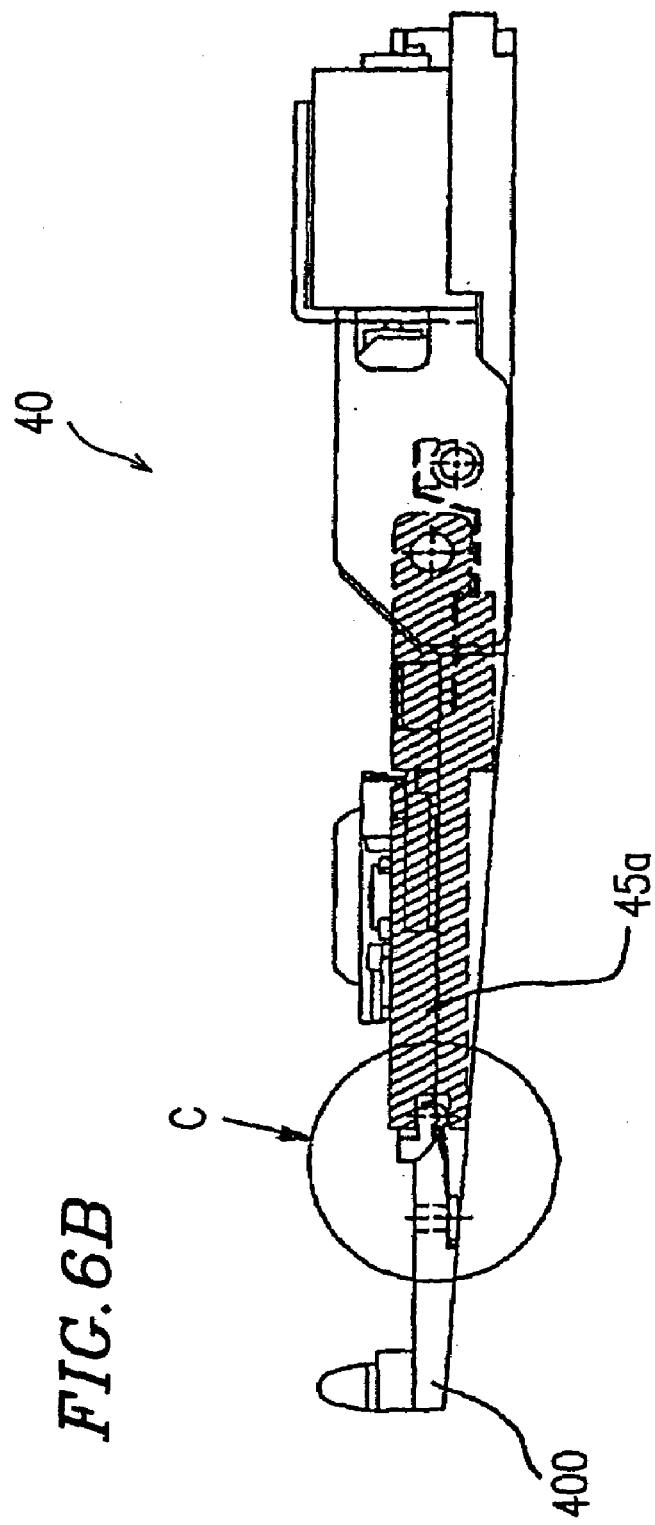

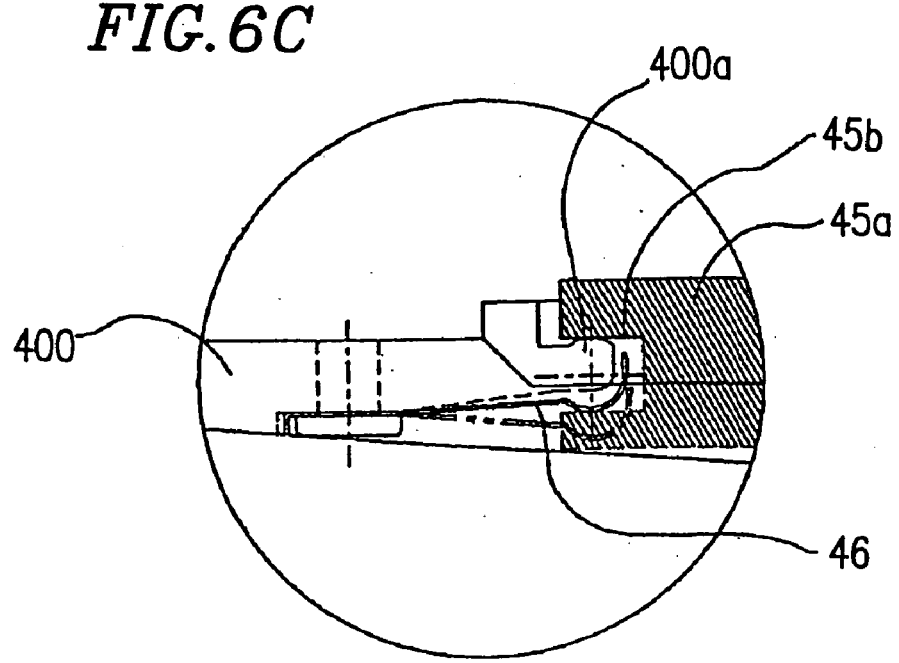

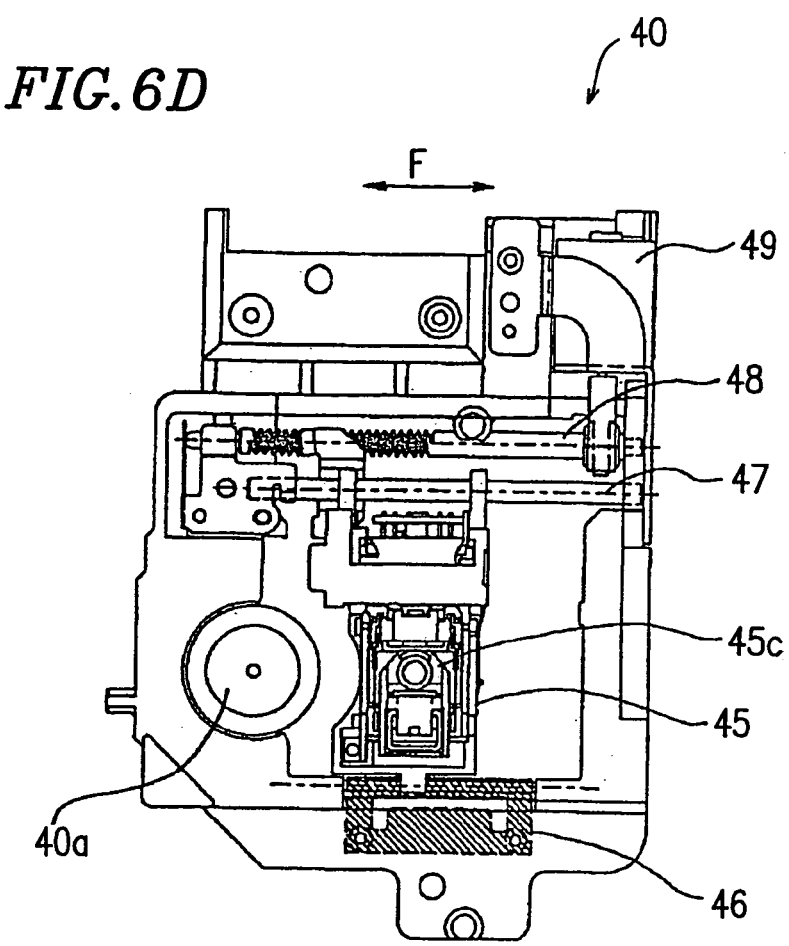

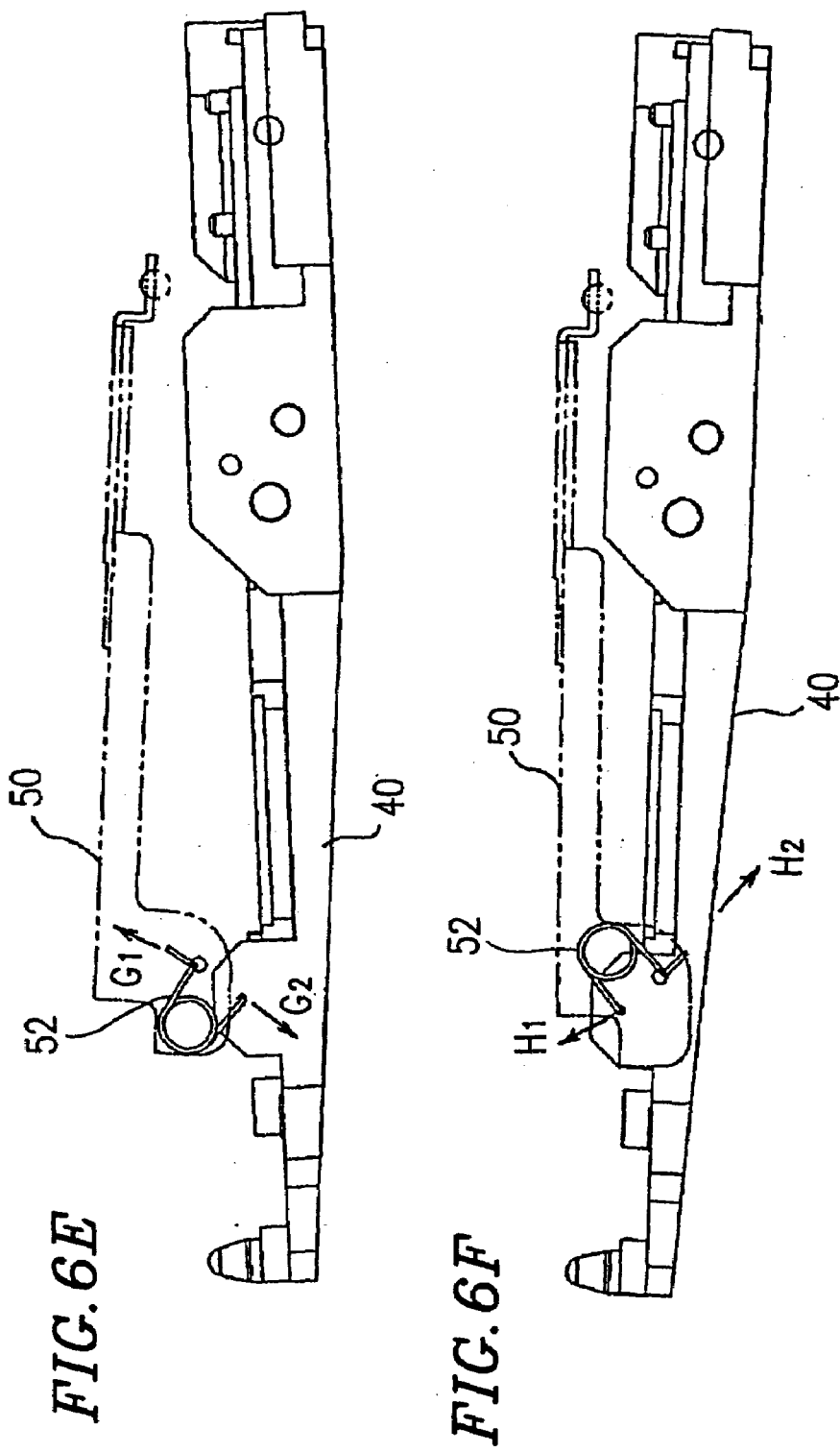

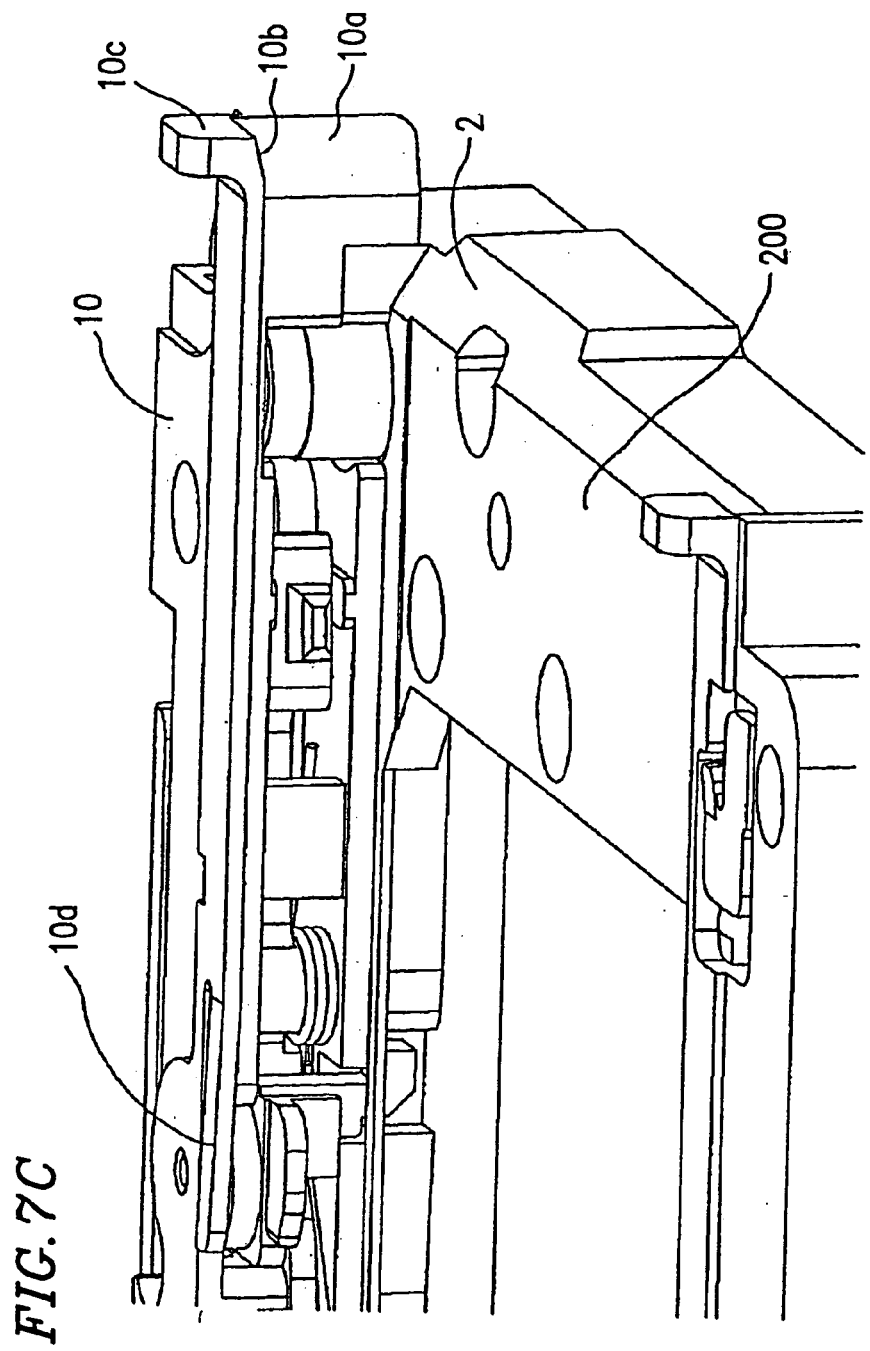

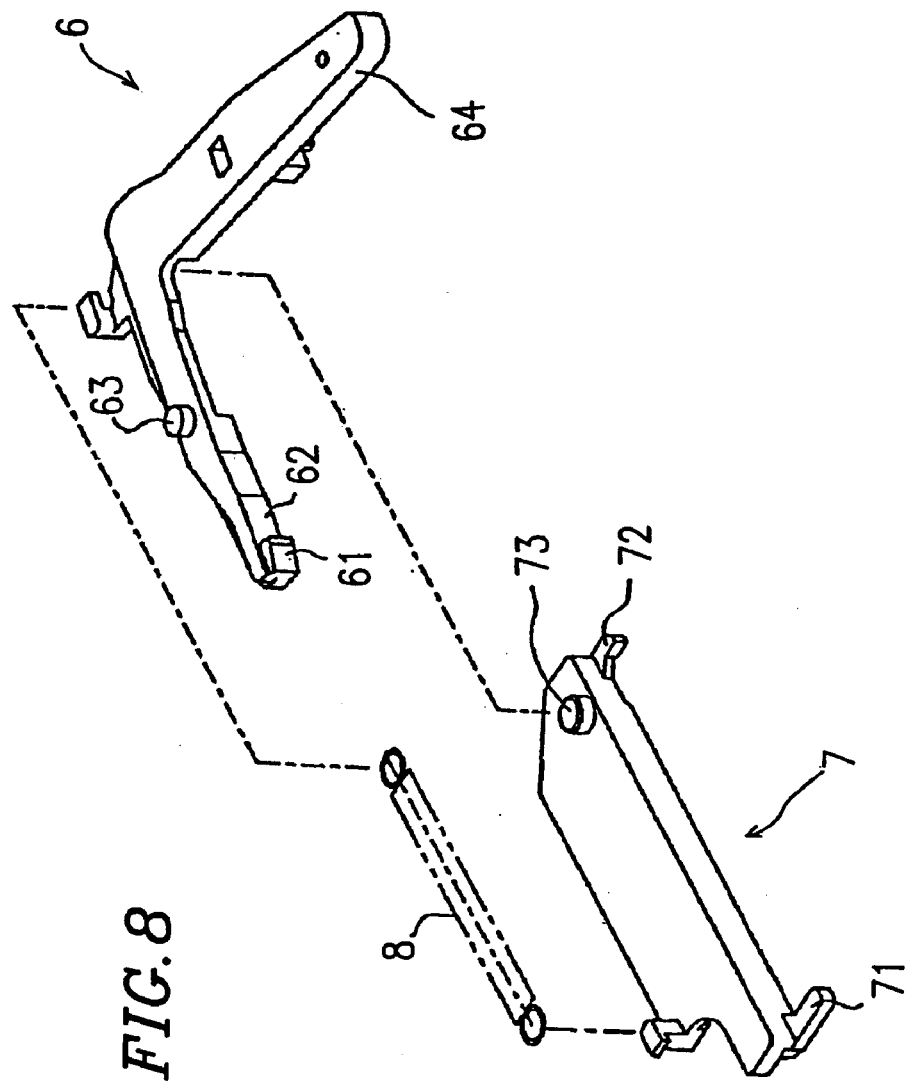

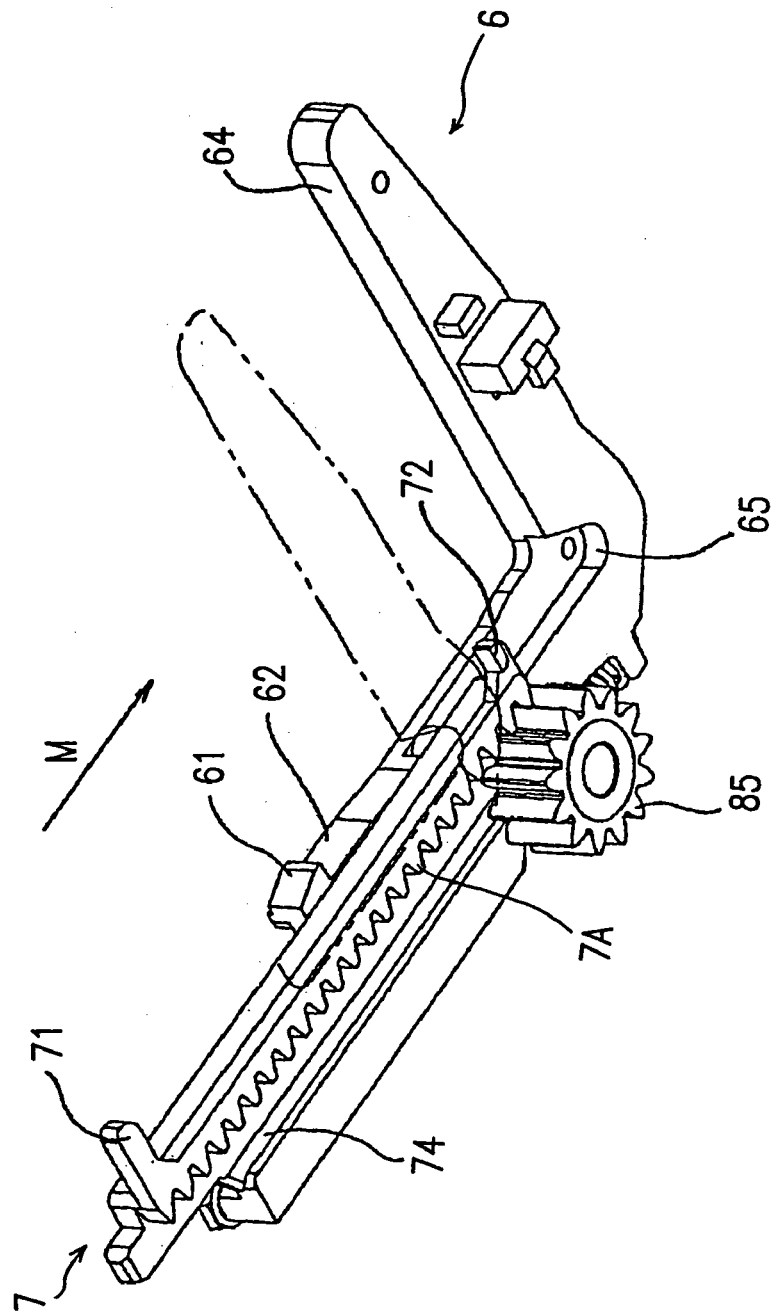

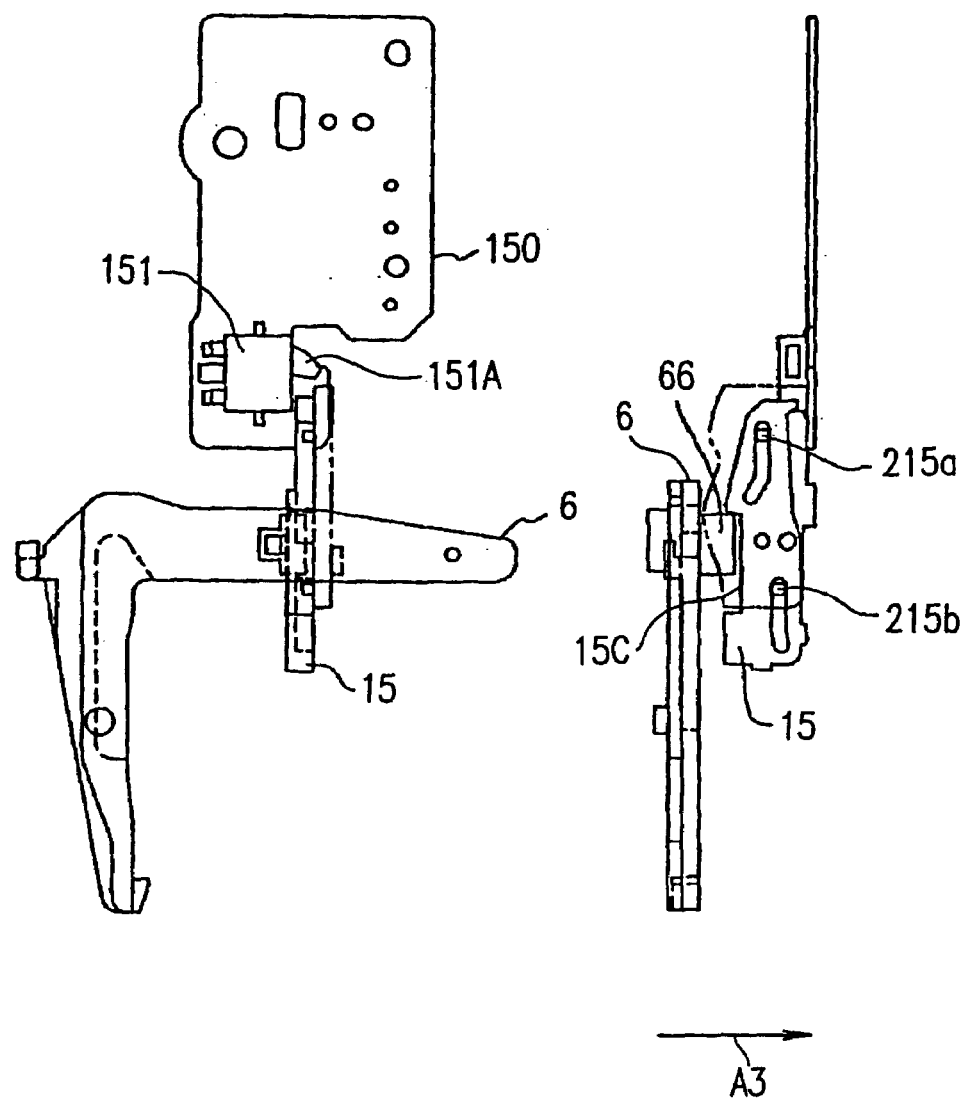

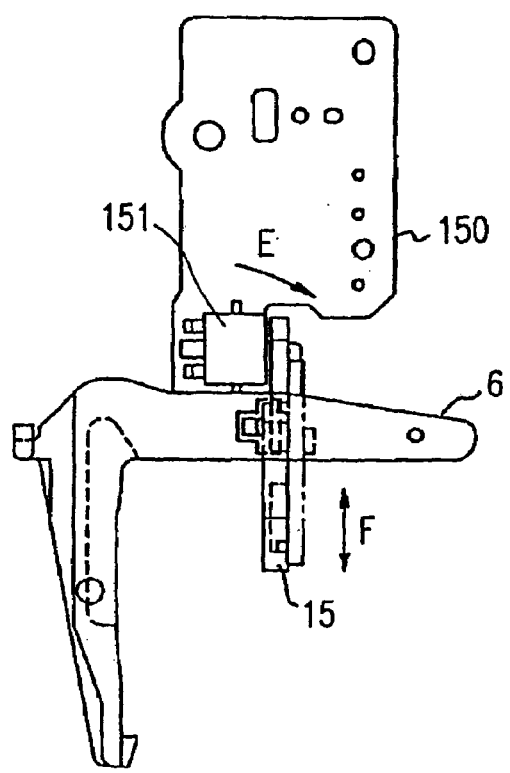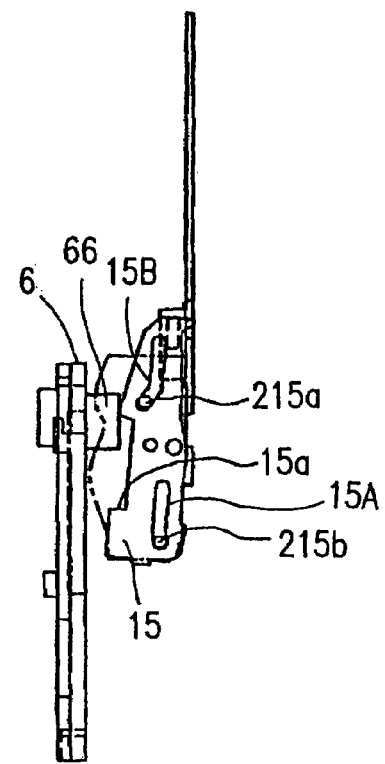

DISK APPARATUS

RELATED APPLICATIONS

The present patent application is a divisional of U.S. patent application Ser. No. 09/486,880, filed on Jun. 19, 2000, now U.S. Pat. No. 6,782,547, incorporated herein by reference, which is a U.S. National Phase Application of PCT International Application No. PCT/JP99/03564 filed Jul. 01, 1999.

TECHNICAL FIELD

The present invention relates to a disk apparatus using a disk as a recording medium, and more particularly to a disk apparatus having an arrangement for loading a disk cartridge securely into the disk apparatus.

BACKGROUND ART

Conventionally, a disk cartridge has been proposed in which a cartridge accommodates a recording disk such as an optical disk or a magneto-optic disk in such a manner that the disk can rotate in the cartridge. The disk cartridge has an opening through which an optical pickup or a magnetic head can access the recording disk so as to write or read an information signal onto or from the disk.

A shutter arrangement whose shutter member can slide is attached to the disk cartridge so that the opening of the cartridge can be opened or closed with the shutter member. When the disk cartridge is not used, the shutter arrangement closes the opening for protection against intrusion by dust or fingers. When the cartridge is used, the shutter member slides away from the opening which is then opened.

A shutter opening/closing arrangement is provided for the disk apparatus, which allows the shutter member to be opened or closed in loading or removing the disk cartridge onto or from the disk apparatus.

The shutter opening/closing arrangement typically includes a shutter opening hook for allowing the shutter member to slide away from the opening which is in turn opened, and a shutter closing hook for allowing the shutter member to slide onto the opening which is in turn closed. In recent years, a small and light-weight disk apparatus is demanded. This demand currently requires a shutter opening/closing arrangement which has simple configuration but securely works while maintaining high performance.

Products using such a disk cartridge is much required to be small in size and in weight in accordance with the trend of the present times. When such a disk apparatus is used in a car, since a space for accommodating the disk apparatus is limited, the outer dimensions of the apparatus need to be minimized.

The above-described cartridge has an advantage of providing ease of use because the recording side of the disk is enclosed so as not to be typically exposed. This ease of use is a reason that the use of such a disk cartridge has been widespread. PCT Japanese National Phase Laid-Open Publication No. 7-7554 discloses a disk apparatus having an emphasis on operability in loading and removing the disk cartridge into and from the disk apparatus.

The invention disclosed the above-described publication will be explained in more detail. The publication describes an auto-loading function in which a disk cartridge is inserted halfway into the apparatus and is then automatically drawn within to a predetermined position. The operation of this auto-loading function will be explained with reference to drawings.

FIG. 25 is a plan view illustrating a disk cartridge 3 for use in a disk apparatus described in the publication. As shown in FIG. 25, an opening 535 is formed, through which an optical pickup or a magnetic head can access and can write or read information.

FIG. 26 is a perspective view illustrating an overview of a disk apparatus 500 into which the disk cartridge 503 is to be inserted. To load the disk cartridge 503 in the disk apparatus 500, the disk cartridge 503 is inserted into an insert slot 546 on the front side of the disk apparatus 500; the disk cartridge 503 pushes a door 547 and enters into a holder 504; when inserted halfway, the disk cartridge 503 and the holder 504 are integrally driven to translate in a horizontal direction and a vertical direction along guide grooves 519 and 520 formed in a frame member 501.

A small and light-weighted disk apparatus for the disk cartridge is required particularly for cars where the accommodation space limits the outer dimensions of the disk apparatus. Furthermore, the disk recording and reproduction should be stable against vibration. A disk apparatus which is carried in a car needs to maintain its quality under rigorous conditions such as user's rough handling.

The above-described disk cartridge which accommodates a recording disk is easy for a user to handle since the recording surface of the disk is enclosed and thus not exposed. The outer surface of the cartridge provides an area for a label which allows consumers to use it in their own way.

Japanese Laid-Open Utility Model Publication No. 5-1006 discloses a downsized disk apparatus.

The object of the invention described in the publication is to facilitate control of movement of a movable support and to reduce the cost. In the disk apparatus, the direction, in which a case accommodating a disk moves in loading or removing, is limited to one direction, and an optical pickup, a spindle motor and the like are also movable, thereby downsizing the disk apparatus.

Hereinafter, the invention described in the above-described publication will be described.

In FIG. 27, a case 610 accommodating a disk is moved in a Y1 or Y2 direction. A movable base 603 carrying an optical pickup can be swung with respect to a fixed base 602 by a base pin 642a provided at an end of the base 603.

FIGS. 28 and 29 show a side view of the disk apparatus shown in FIG. 27 from the left side thereof. An elevator member 644 is moved in the right or left direction of FIGS. 28 and 29. This movement allows cam grooves formed in the resin plates 651a and 651b to move the base pins 642a and 642b upward or downward, so that the optical pickup is moved from a standby position to a play position or vice versa.

Japanese Laid-Open Publication No. 8-45159 discloses a conventional shutter opening/closing arrangement having a simple configuration which will be explained below.

FIG. 30 illustrates a cartridge 705 accommodating a disk in such a manner that the disk can rotate in the cartridge. The cartridge 705 includes an opening 723 for a magnetic head on the upper side of the cartridge. A portion of the signal recording surface of a disk is exposed through the opening 723. The cartridge 705 also includes an opening 722 for an optical pickup on the lower side of the cartridge at a position corresponding to the opening 723. The opening 723 for a magnetic head and the opening 722 for an optical pickup can be opened and closed by a shutter member 706. The shutter member 706 includes an upper cover plate and a lower cover plate corresponding to the openings 723 and 722, respectively, and facing each other in parallel; and a supported plate for linking one end of the upper cover plate and one end of the lower cover plate. These three plates are integrally made of a thin metal plate. The supported plate can slide along a guide groove 707 formed on a side of the cartridge 705.

In FIGS. 31 and 32, a rotating member 710 made of synthesized resin or the like is biased in the counterclockwise direction around a support hole 757. The rotating member 710 has a shutter hook 760 at the front end thereof used in closing the openings, the hook extending toward the cartridge 705; and a rotation controlling portion 761 extending toward the cartridge 705 at the rear end thereof. The hook 760 and the portion 761 are integrally combined.

Then, the operation of the shutter opening/closing arrangement will be explained below.

When the cartridge 705 is being inserted in a direction shown by arrow B1 in FIG. 31, the shutter closing hook 760 is initially positioned apart from the shutter member 706 on the right side of the cartridge 705. When the cartridge 705 is inserted, the cartridge 705 strikes the rotation controlling portion 761 so that the rotating member 710 rotates in a direction shown in FIG. 31 by an arrow D, allowing the shutter closing hook 760 to snap and engage into a shutter closing hole 708. Then the cartridge 705 further goes inside the disk apparatus when a shutter opening hook 759 strikes the front end of the supported plate and then prevents the shutter member 706 from moving further while still allowing the cartridge 705 to continue to move, so that the openings 722 and 723 are opened.

When the cartridge 705 is to be removed from the disk apparatus, the engagement of the shutter closing hook 760 with the shutter closing hole 708 prevents the shutter member 706 from moving while allowing the cartridge 705 to continue to move, so that the openings 722 and 723 are closed.

As the cartridge 705 is drawn, the contacting and pressing of the cartridge 705 and the rotation controlling portion 761 are released. The rotating member 710 is rotated by the bias force to return to the initial position so that the openings 722 and 723 are closed.

The returning of the rotating member 710 to the initial position releases the engagement of the shutter closing hook 760 with the shutter opening hole 708, allowing the cartridge 705 to be removed from the disk apparatus.

The disk cartridge driving arrangement described in PCT Japanese National Phase Laid-Open Publication No. 7-7554 has the following disadvantages.

Initially, since the holder moves horizontally as well as vertically, the height dimension of the disk apparatus is great. Moreover, the holder needs to be moved without getting horizontally snagged. This leads inevitably to a complicated arrangement, resulting in a large number of required parts.

When the cartridge is being inserted into the disk apparatus and there is slide movement between an outer side of the cartridge and a disk apparatus side member, if there are burrs and the like on the outer sides of the cartridge, even if they are small, the cartridge may get snagged in the disk apparatus.

The disk apparatus described in Japanese Laid-Open Utility Model Publication No. 5-1006 has the following disadvantages. The size of the elevating member for driving the movable base is great. The method of driving the member is also complicated. The number of sliding portions is great, so that the number of parts is increased, and wear and the like occur in the parts, which leads to poor endurance.

The positioning accuracy of the movable base depends on the outer diameter of the base pin and the width of the cam grooves provided on the resin plate. Some amount of clearance is required between the pin and the edge of the groove. This clearance degrades the positioning accuracy of the movable base.

Conventional techniques other than those described in the above publications have the following disadvantages.

The positioning of the pickup requires a high level of accuracy in moving in the radial direction of a disk after the pickup has been placed in the play position. A means for holding the pickup typically includes a biasing means such as a spring so as to absorb a pickup rattle. Some apparatuses write or read data onto or from a rotating disk in a constant linear velocity (CLV) mode. In this mode, the linear speed of a track which the pickup currently writes or reads data onto or from is constant regardless of whether the pickup is positioned on the outer or inner region of the disk. The constant linear track speed requires fast rotation when the pickup is tracking the inner region, and slow rotation when the pickup is tracking the outer region.

In the disk apparatuses which operate in the CLV mode, the inner region of the disk has greater vibration caused by the disk rotation than the outer region. It is believed that the bias force should be increased for the pickup when tracking the inner region. Conventional disk apparatuses have not taken this into account.

Conventional disk apparatuses have not taken measures against user's rough and erroneous handlings such as inserting a disk cartridge with great force or in a wrong way.

A conventional disk apparatus uses a holder as a means for carrying a disk cartridge. The holder is typically fabricated by bending a metal sheet in such a manner that all the sides or at least left and right and upper sides of the cartridge are covered with the metal sheet.

As described above, users may stick labels on the label area of the cartridge in various ways. The labels may be provided by the users as they like.

In the disk apparatus using the holder having the above-described conventional configuration, when a thick label or multiple labels are stuck on the cartridge and the cartridge is left in the disk apparatus for a long time, the label may become warped. Such a warped label may get snagged at the slot of the disk apparatus when the user tries to remove it, so that the cartridge is not removed or the label remains alone inside the disk apparatus.

The shutter opening/closing arrangement described in Japanese Laid-Open Publication No. 8-45159 has the following disadvantages.

When the cartridge is being inserted into the disk apparatus, the timing in which the rotation of the rotating member may occurs against bias force thereof before the shutter closing hook meets the shutter closing hole and the timing in which the shutter closing hook and the shutter closing hole face each other are compared. When the former occurs earlier than the latter, the hook strikes a portion other than the hole, resulting in undue stress which is likely to forcedly deform the rotating member which strains the rotating member. When the latter occurs earlier than the former, because of random positions where the shutter opening hook is settled, undue stress which is likely to forcedly deform the rotating member results on the rotating member.

There are similar problems when the cartridge is removed from the disk apparatus. When the contacting and pressing of the rotation controlling portion and the cartridge is released and the rotating member returns by bias force to the original position before the shutter member completely closes the openings, the cartridge with the unclosed openings is removed outside the disk apparatus. When the shutter member completely closes the openings before the returning of the rotating member to the initial position, the shutter closing hole catches on the shutter closing hook so that the cartridge cannot be removed from the disk apparatus.

The rotation of the rotating member is controlled by the contacting and pressing of the rotation controlling portion and the cartridge. Specifically, the contacting and pressing is regulated by the round-shape portion of a corner of the cartridge rather than the straight-shaped portion of a side of the cartridge. The shape of the corner is not strictly specified by the standard for the cartridge. The dimensions of the corner vary among manufacturers. Therefore, the above-described problems may arise in some cartridges.

When a cartridge with the slightly opened shutter member caused by user's accidental handling is inserted into the disk apparatus, there is undue stress on the above-described shutter opening/closing arrangement, resulting in awkward insertion.

An objective of the present invention is to provide a small-size disk apparatus including a disk loading arrangement having a simple configuration in which a cartridge is highly reliably loaded into the disk apparatus, a disk does not get snagged in loading, and the disk loading arrangement securely works while avoiding parts being broken in misoperation.

Another objective of the present invention is to provide a disk apparatus in which even when a label stuck on a disk cartridge is warped, the disk cartridge can be removed without the label getting snagged on the slot of the disk apparatus.

Still another objective of the present invention is to provide a disk apparatus including a shutter opening/closing arrangement having a simple configuration in which the shutter opening/closing arrangement can be produced at lower cost, has a high level of reliability, and securely works against misoperation.

DISCLOSURE OF THE INVENTION

According to one aspect of the present invention, a disk apparatus, in which a cartridge accommodating a disk-like recording medium and having an opening opened or closed by a shutter member is loaded to the disk apparatus, includes a loading chassis; a cartridge transporting member provided on the loading chassis for transporting the cartridge from a removal position to a play position; a traverse unit for carrying a pickup for recording or reproducing a signal onto or from the disk-like recording medium; a traverse transporting member provided on the loading chassis for transporting the traverse unit from a standby position to the play position; and a driving section for driving the cartridge transporting member and the traverse transporting member. The cartridge transporting member and the traverse transporting member can slide in a direction of transporting the cartridge. One of the cartridge transporting member and the traverse transporting member is disposed on the other. In loading the cartridge, the driving section starts to drive only the cartridge transporting member before the cartridge transporting member drives the traverse transporting member; and the cartridge reaches the play position before the driving section drives only the traverse transporting member. Therefore, the above-described objectives are achieved.

In one embodiment of the invention, the cartridge transporting member has a first rack gear portion. The traverse transporting member has a second rack gear portion. The driving section has a driving gear for driving the cartridge transporting member and the traverse transporting member. The driving gear engages with the first and second rack gear portions in such a manner as to transport the cartridge and the traverse unit. When the driving gear simultaneously drives the cartridge and the traverse unit, the first and second rack gear portions engages with the driving gear in the same phase.

In one embodiment of the invention, the cartridge transporting member has a first engagement portion. The traverse transporting member has a second engagement portion In loading the cartridge, the driving section drives only the cartridge transporting member before the first engagement portion drives the traverse transporting member. In removing the cartridge, the driving section drives only the traverse transporting member before the second engagement portion drives the cartridge transporting member.

In one embodiment of the invention, the disk apparatus further includes an engagement member. In loading/removing the cartridge, when only one of the cartridge and traverse transporting members is driven by the driving section, the engagement member regulates movement of the other.

In one embodiment of the invention, the disk apparatus further includes a biasing section for, in transporting the cartridge, biasing the cartridge in a direction substantially perpendicular to the direction of transporting the cartridge.

In one embodiment of the invention, the biasing section includes a leading arm being substantially L-shaped; and an elastic body for linking the leading arm to the cartridge transporting member. The leading arm includes a stopping hook portion provided on one end of the leading arm for engaging with a hole provided on a side of the cartridge; a pushing portion provided on the other end of the leading arm for pushing the cartridge; and a boss portion for engaging with a cam groove provided on the loading chassis. In transporting the cartridge, movement of the biasing section is controlled by the cam groove; the stopping hook portion engages with the hole in such a manner as to prevent the cartridge from coming out of the disk apparatus; and at the end of the removal operation, the cam groove controls movement of the biasing portion in such a manner that the biasing portion is biased by the pushing portion to apply bias force to the cartridge toward the outside of the disk apparatus.

In one embodiment of the invention, the biasing section has a U-shaped groove for engaging with the boss provided on the cartridge transverse member. The biasing section is linked via an elastic body to the cartridge transverse member in such a manner as to apply bias force to the cartridge transporting member toward the front side of the disk apparatus.

In one embodiment of the invention, the disk apparatus further includes a plurality of roller members. The plurality of roller members are provided on the trajectory of the outer side of the shutter member on the cartridge, and contact the outer circumference side of the cartridge, in such a manner as to be free to rotate, and in the cartridge transporting operation, guide the cartridge.

According to another aspect of the present invention, a disk apparatus, in which a cartridge accommodating a disk-like recording medium and having an opening opened or closed by a shutter member is loaded to the disk apparatus, includes a loading chassis; a cartridge transporting member provided on the loading chassis for transporting the cartridge from a removal position to a play position; a traverse unit for carrying a pickup for recording or reproducing a signal onto or from the disk-like recording medium; a traverse transporting member provided on the loading chassis for transporting the traverse unit from a standby position to the play position; and a driving section provided on the loading chassis for driving the cartridge transporting member and the traverse transporting member. The cartridge transporting member and the traverse transporting member can slide in a direction of transporting the cartridge. One of the cartridge transporting member and the traverse transporting member is disposed on the other. The disk apparatus further includes a detecting switch for detecting insertion of the cartridge; and a switch rod provided on the loading chassis in such a manner that the switch rode can slide, the switch rod switching the detecting switch in association with movement of the cartridge transporting member, the switch rod having a groove portion. In the cartridge loading operation, the cartridge transporting member is engaged in the groove portion in such a manner that the switch rod is slid in the direction of loading the cartridge to switch ON the detecting switch, and the cartridge transporting member continues to move in the loading direction to pass over the switch rod. In the cartridge removing operation, the cartridge transporting member is move in a direction of removing the cartridge to be engaged into the groove again in such a manner that the cartridge transporting member is moved in a direction of removing the cartridge to switch OFF the detecting switch; and when the detecting switch is in the ON state, reactive force in the loading direction or the removing direction of the detecting switch is not applied to the switch rod. Therefore, the above-described objectives are achieved.

According to another aspect of the present invention, a disk apparatus, in which a cartridge accommodating a disk-like recording medium and having an opening opened or closed by a shutter member is loaded to the disk apparatus, includes a loading chassis; a cartridge transporting member provided on the loading chassis for transporting the cartridge from a removal position to a play position; a traverse unit for carrying a pickup for recording or reproducing a signal onto or from the disk-like recording medium; a traverse transporting member provided on the loading chassis for transporting the traverse unit from a standby position to the play position; and first and second cartridge guiding members provided on the opposite sides of a path through which the cartridge is transported. The first and second cartridge guiding members provide an open area for a label on a major side of the cartridge. The first and second cartridge guiding members hold both the upper edges of the cartridge. Therefore, the above-described objectives are achieved.

In one embodiment of the invention, the loading chassis has a guiding side for supporting and guiding the lower side of the cartridge from the removal position to the play position.

In one embodiment of the invention, the first and second cartridge guide members and the loading chassis each have a slope portion at a cartridge insertion slot thereof. The traverse unit is suspended from the loading chassis where one end of the traverse unit is attached to the loading chassis in such a manner that the traverse unit can swing.

In one embodiment of the invention, the cartridge has a groove in a lateral side thereof. The first and second cartridge guide members each have a protection piece having a size larger than the width of the groove on the upper portion of the cartridge insertion slot.

According to another aspect of the present invention, a disk apparatus, in which a cartridge accommodating a disk-like recording medium is loaded into the disk apparatus, includes a loading chassis; a cartridge pressure member provided on the loading chassis for pressing the cartridge; and a horizontally transporting section for transporting the cartridge pressure member in a horizontal direction. The loading chassis has a pair of sloped cam sides facing each other. The cartridge pressure member has a pair of cam follower portions corresponding to the cam sides. One end of the cartridge pressure member has tongue-shaped piece capable of contacting and pressing an upper end of the cartridge. The horizontally transporting section transports the other end of the cartridge pressure member in the horizontal direction via an elastic member.

In one embodiment of the invention, the disk apparatus further includes a traverse unit for carrying a pickup for recording or reproducing a signal onto or from the disk-like recording medium. The horizontally transporting section has a traverse transporting section for transporting the traverse unit from the standby position to the play position.

According to another aspect of the present invention, a disk apparatus includes a loading chassis; a traverse chassis having a cartridge positioning pin; an elevation driving section provided on the loading chassis for moving the traverse chassis lying obliquely below the loading chassis in a standby state to a predetermined reproduction position in the loading chassis; a first pressure member for pressing an upper end of a first lateral side of the cartridge near a cartridge positioning hole; a second pressure member for pressing an upper end of a second lateral side of the cartridge opposite to the first side. The cartridge positioning pin starts to engage into the cartridge before the first pressure member presses the upper end of the first lateral side of the cartridge. The elevation driving section moves the traverse chassis to the reproduction position before the second pressure member presses the upper side of the second lateral side of the cartridge.

According to another aspect of the present invention, a disk apparatus includes a loading chassis providing a guide side for guiding a cartridge forward or backward with the lower side of the cartridge serving as a sliding side; a shutter opener fixed on the loading chassis for opening a shutter of the cartridge transported forward or backward; and first and second cartridge guiding members provided on the opposite sides of a path through which the cartridge is transported forward or backward. At least one of the first and second cartridge guiding members has a guiding portion positioned above the shutter opener. The guiding portion is made of elastic resin material. The guiding portion has a crena which can be deformed upward by a predetermined distance.

According to another aspect of the present invention, a disk apparatus includes a traverse unit for carrying pickup for recording or reproducing a signal onto or from a disk-like recording medium, and a spindle motor for chucking and rotating the disk-like recording medium in play. One end of the pickup is mounted on the traverse unit in such a manner that the pickup can swing and translate in a radial direction of the disk-like recording medium. The other end of the pickup is loosely engaged in the traverse unit and is biased in one direction by an elastic member.

In one embodiment of the invention, the elastic member is in the shape of a slim plate. The end of one side of the elastic member is fixed on the traverse unit. The bias force applied to the pickup varies along the radial direction of the disk-like recording medium.

According to another aspect of the present invention, a disk apparatus, in which a cartridge accommodating a disk-like recording medium is loaded into the disk apparatus, includes an opening and a shutter member for opening or closing the opening, includes a loading chassis; a shutter opening member; a shutter closing member; and a first biasing section for biasing the shutter closing member in one direction. The shutter closing member is provided on the loading chassis in such a manner that the shutter closing member can rotate. The shutter closing member has a first rotation controlling portion provided on one end thereof, and a shutter closing hook provided on the other end thereof. The biasing section has a second rotation controlling portion provided on one end thereof. In loading the cartridge, the second and first rotation controlling portions contact and press the cartridge in this order in such a manner that rotation of the shutter closing member allows the shutter closing hook to engage in an hole of the shutter member. As the cartridge is loaded further inside the disk apparatus, the shutter opening member contacts and presses the shutter member so as to opens the opening. Therefore, the above-described objectives are achieved.

In one embodiment of the invention, the shutter closing member has a bend portion in the vicinity of the first rotation controlling portion.

In one embodiment of the invention, the shutter closing hook has a contour on the front side of the disk apparatus which forms a substantially tangential line of the trajectory of rotation of the shutter closing member.

In one embodiment of the invention, the first biasing section is attached to the shutter closing member. The second rotation controlling portion has a girder structure which is elastically deformable.

In one embodiment of the invention, the first biasing section has wire spring.

In one embodiment of the invention, the disk apparatus further includes a second biasing section for biasing the cartridge toward the shutter member side in loading the cartridge into the disk apparatus.

BRIEF DESCRIPTION OF THE DRAWINGS

FIG. 6B is an elevation view illustrating the traverse unit of the disk apparatus according to the present invention.

FIG. 6C is an enlarged view of FIG. 6B.

FIG. 6D is a plan view illustrating the traverse unit of the disk apparatus according to the present invention.

FIG. 6E is an elevation view of a right pressure lever spring of the disk apparatus according to the present invention for explaining the operation thereof.

FIG. 6F is an elevation view of a right pressure lever spring of the disk apparatus according to the present invention for explaining the operation thereof.

FIG. 7C is a perspective view illustrating a configuration around an slot of the disk apparatus according to the present invention.

FIG. 8 is a perspective view illustrating a configuration around a leading arm of the disk apparatus according to the present invention.

FIG. 9 is a perspective view illustrating the configuration around the leading arm shown in FIG. 8 viewed from the rear side thereof.

FIG. 10A is a plan view illustrating a configuration around a switch rod of the disk apparatus according to the present invention.

FIG. 10B is an elevation view illustrating the configuration around the switch rod of the disk apparatus according to the present invention.

FIG. 11A is a plan view illustrating the configuration around the switch rod of the disk apparatus according to the present invention.

FIG. 11B is an elevation view illustrating the configuration around the switch rod of the disk apparatus according to the present invention.

BEST MODE FOR CARRYING OUT THE INVENTION

EXAMPLE 1

Example 1 of the present invention will be described below with reference to the accompanying drawings.

Figure 1:
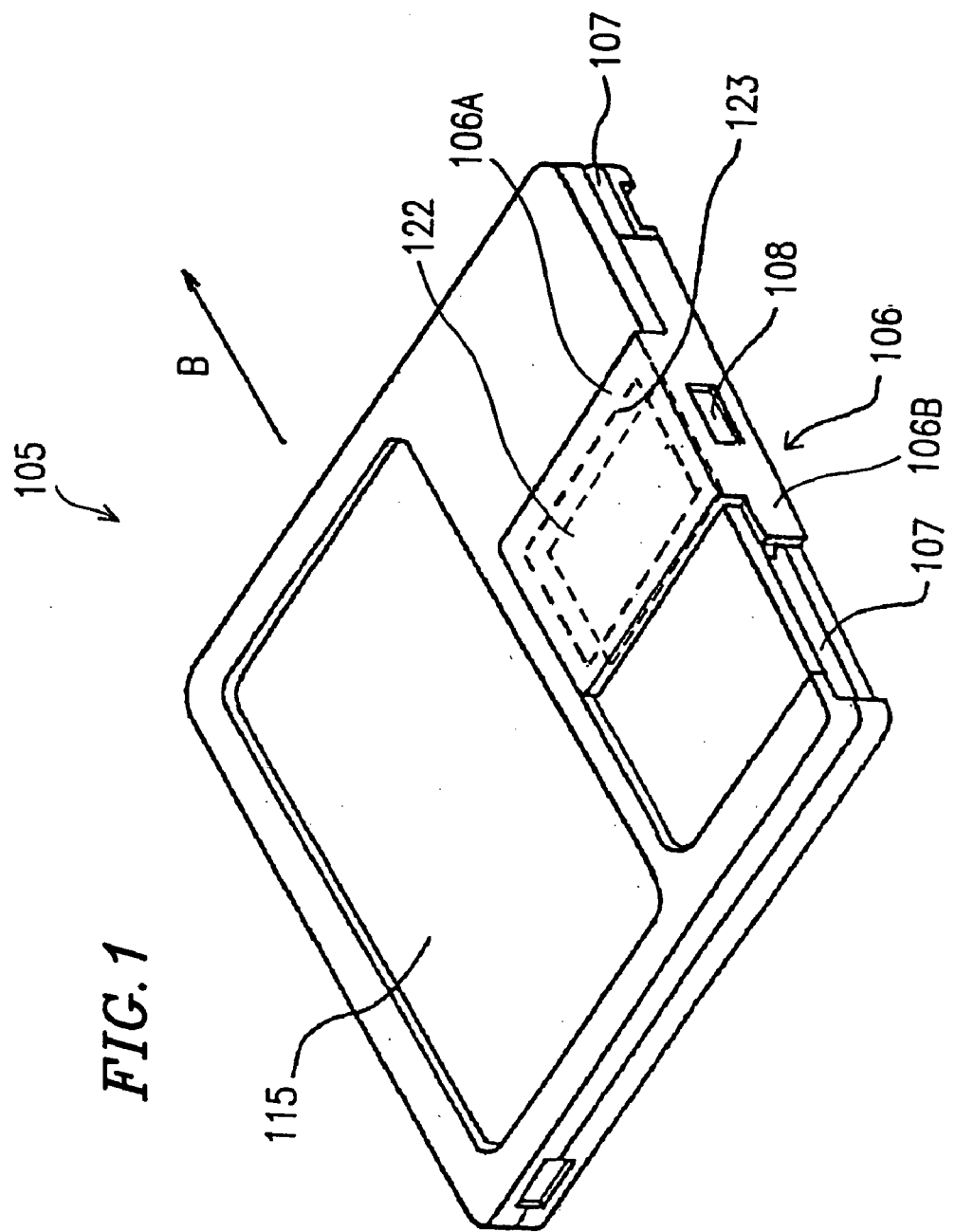
FIG. 1 is a perspective view illustrating a cartridge used in a disk apparatus according to the present invention.

FIG. 1 is a perspective view of a disk cartridge which is to be loaded into a disk apparatus according to the present invention. As shown in FIG. 1, a disk medium is accommodated in a cartridge 105 in which the disk medium can rotate.

The cartridge 105 includes an upper-half housing and a lower-half housing which are butt-joined. The length of a side of the cartridge 105 is nearly equal to the diameter of the disk within. The major sides of the cartridge 105 are in the shape of a rectangle. The cartridge 105 is also slim. On its upper major side, as shown in FIG. 1, the cartridge 105 has an opening 123 for a magnetic head through which a portion of the signal recording surface of the disk medium is exposed to the outside. The opening 123 for the magnetic head is a rectangle and spans from a near-center portion of the major side of the upper-half housing to a near-edge portion. The cartridge 105 also has an opening 122 for an optical pickup on the lower major side thereof and at a position facing the opening 123 for a magnetic head. The cartridge 105 is inserted in a direction shown by arrow B to be loaded into the disk apparatus through the front side thereof. Hereinbelow, a side of the cartridge 105 which is first inserted is referred to as the front side while the opposite side is referred to as the rear side.

On the upper major side of the cartridge 105, a label sticking area 115 is provided. The label sticking area 115 has a depth and a shape corresponding to the thickness and shape of a label to be stuck thereon.

Note that the height of the label sticking area 115 after a label has been stuck thereon is permitted to rise above the height of both the lateral sides of the cartridge 105 in view of user's convenience. Therefore, floating and peeling-off of the label itself need to be taken into account.

In the cartridge 105, the opening 123 for the magnetic head and the opening 122 for the optical pickup can be opened or closed by a shutter member 106. The shutter member 106 includes an upper cover plate 106A and a lower cover plate (not shown), which face each other in parallel and correspond to the openings 123 and 122, and a supported plate 106B which links one end of the upper cover plate 106A and one end of the lower cover plate. The three plates are integrally formed of a metal sheet or resin. The supported plate 106B is supported on a side of the cartridge 105 in such a manner that the shutter member 106 can slide along a guide groove 107 formed on the side of the cartridge 105. The guide groove 107 extends in an insertion direction B up to the front end of the right side of the cartridge 105. The guide groove 107 is open-ended at the front end thereof.

The shutter member 106 has a shutter closing hole 108 in a near-center portion of the supported plate 106B toward the lateral side. The shutter closing hole 108 is a through hole for use in closing the shutter member 106 such that a shutter closing hook is engaged in the shutter closing hole 108.

Figure 2:
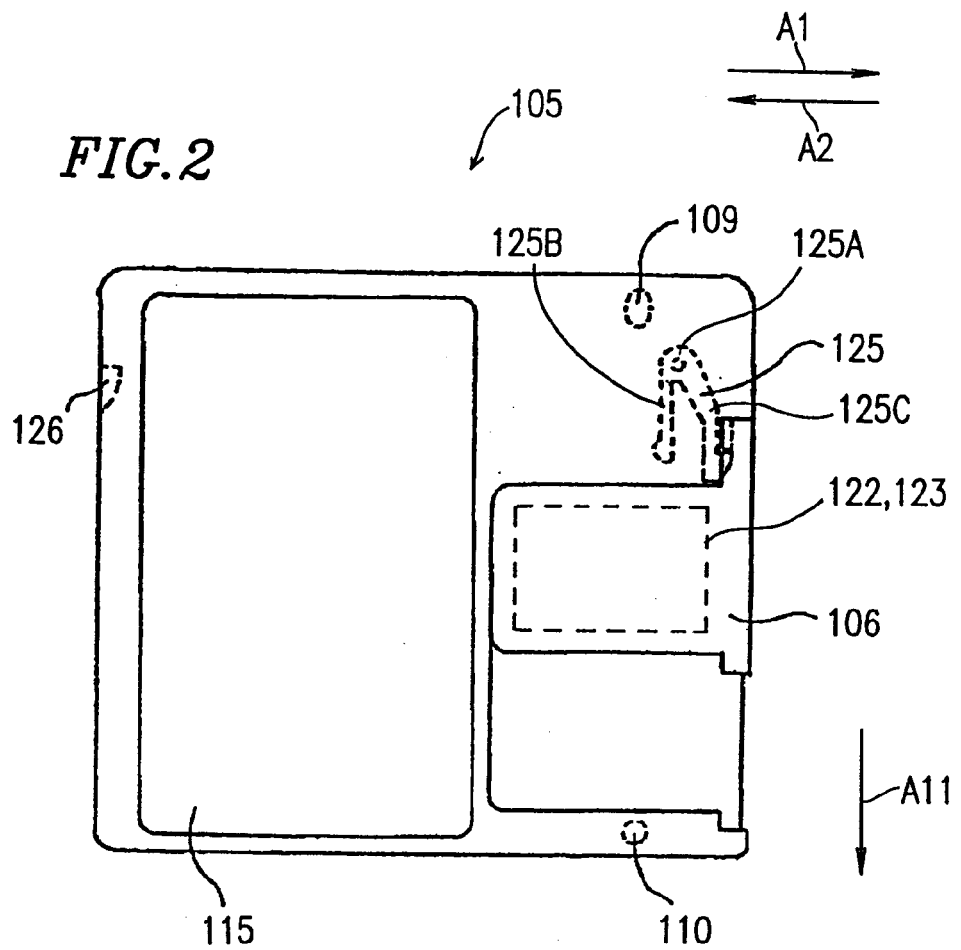
FIG. 2 is a plan view illustrating the cartridge used in the disk apparatus according to the present invention.

Within the cartridge 105, as shown in FIG. 2, a lock member 125 is provided on one lateral side of the front side. The lock member 125 includes a pivot 125A, and a support arm 125B and a lock arm 125C formed to protrude from the pivot 125A, which are integrally formed of synthesized resin material. The pivot 125A of the lock member 125 is engaged in an engagement pit of the cartridge 105. The support arm 125B contacts and presses an inwardly protruded wall (not shown) of the cartridge 105 so that the arm 125B cannot rotate around the pivot 125A. The lock arm 125C can access the guide groove 107 from the inside. The lock arm 125C is elastically biased toward the outside (a direction shown by arrow A1) by elasticity of the lock member 125 itself.

The lock arm 125C engages with the shutter member 106 to prevent movement of the shutter member 106 when the shutter member 106 is closed.

The engagement of the lock arm 125C with the shutter member 106 is released when the lock arm 125C is displaced inwardly (in a direction shown by arrow A2) against the elasticity of the lock member 125. This allows the shutter member 106 to move backward (in a direction shown by arrow A11). When the shutter member 106 is closed, the lock arm 125C engages with the shutter member 106 by the bias force of the lock member 125.

In FIG. 2, the cartridge 105 has an engagement portion 126 in the left side thereof. The engagement portion 126 engages with a leading member in loading the disk cartridge 105, thereby preventing the cartridge 105 from coming out of the disk apparatus.

On its lower major side, the cartridge 105 has a pair of positioning holes 109 and 110 which are provided on the front and rear sides of the cartridge 105, respectively. The front positioning hole 109 is in the shape of an ellipse where its major axis is oriented in the insertion direction and is located on the front and peripheral region of the major side of the front side of the above-described opening 122 for the optical pick-up. The rear positioning hole 110 is in the shape of a circle and is located on the rear and peripheral region of the major side of the rear side of the above-described opening 122 for the optical pick-up.

Figure 3:
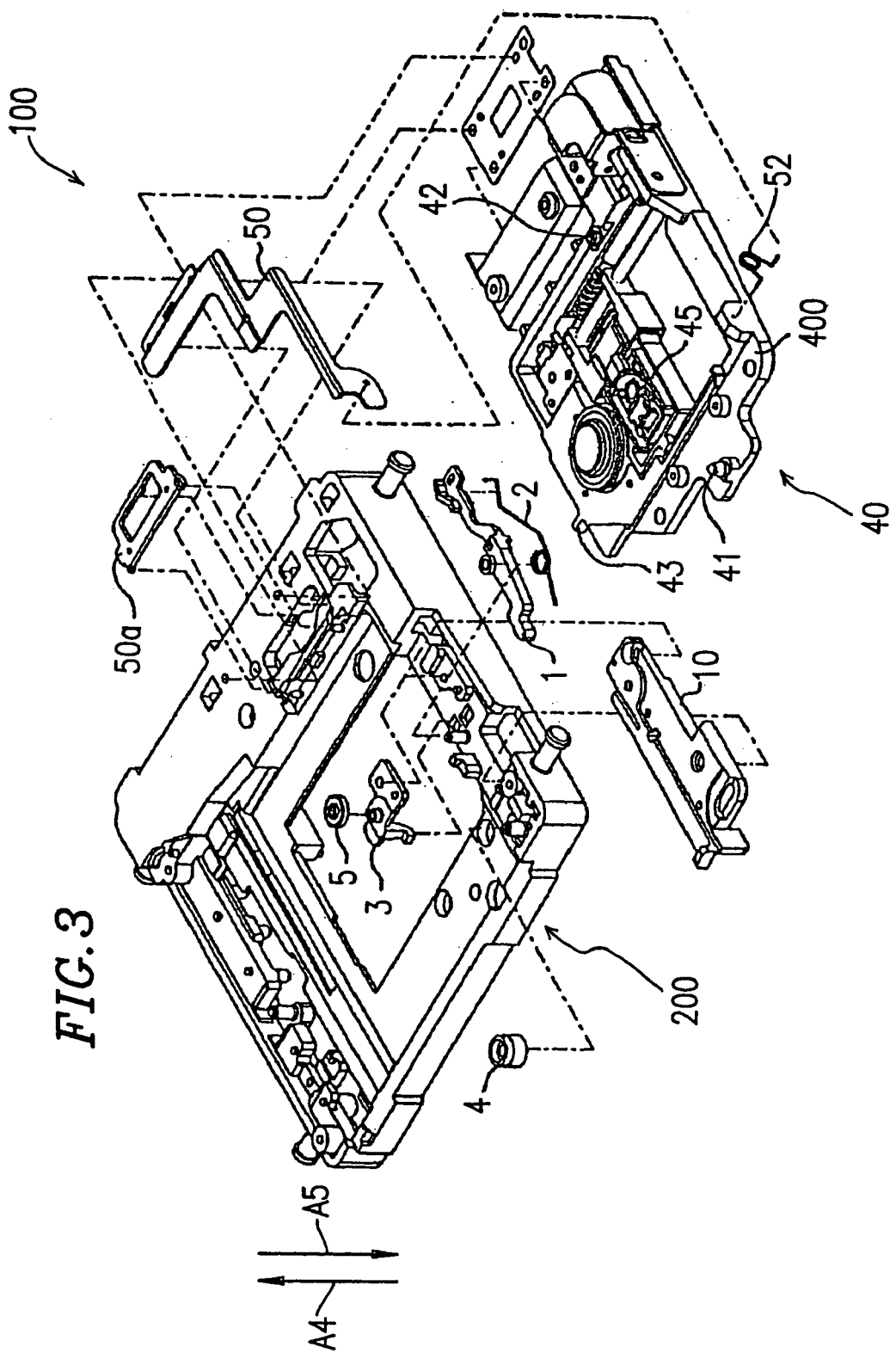
FIG. 3 is a perspective view illustrating major parts of the disk apparatus according to the present invention.
Figure 4:
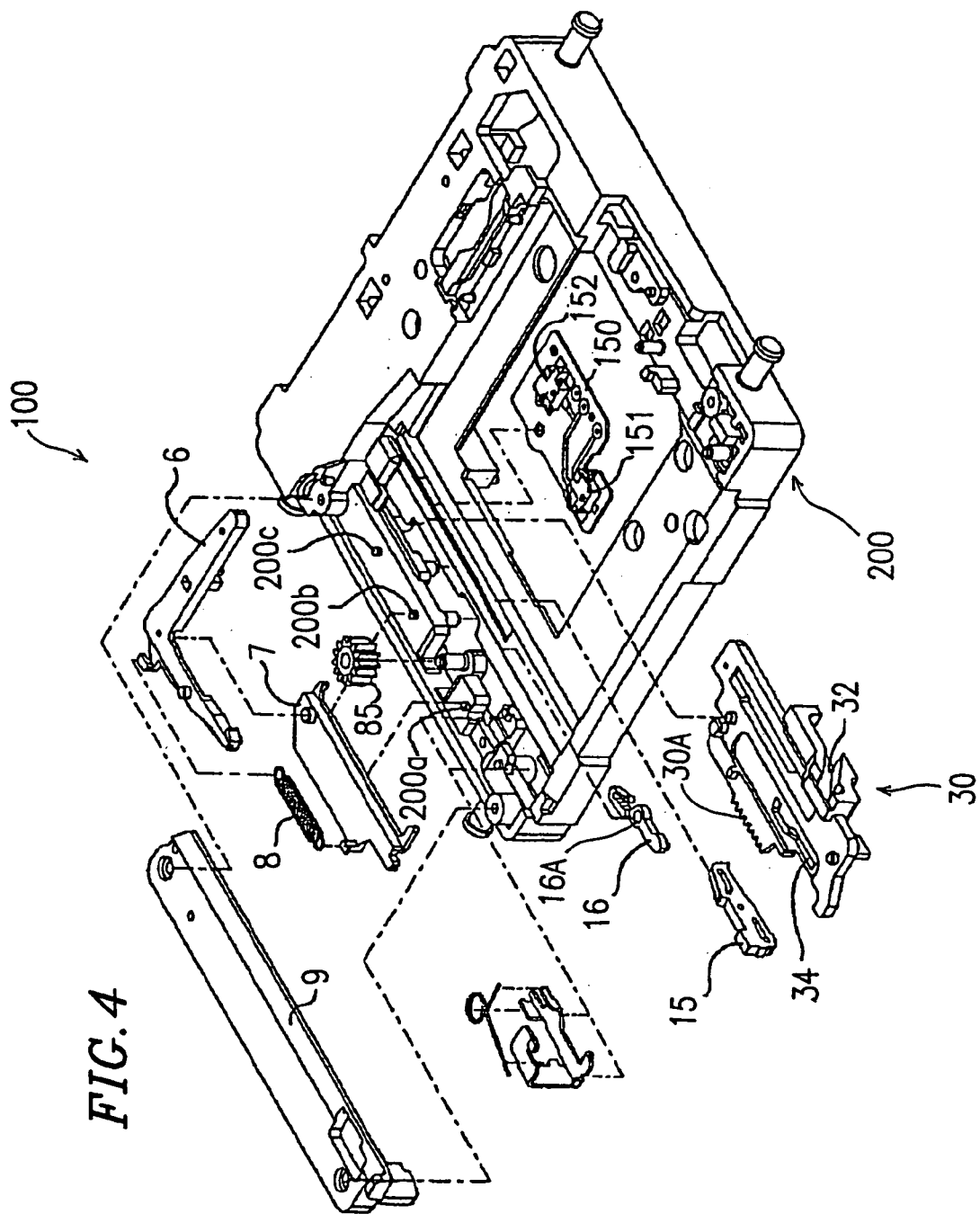
FIG. 4 is a perspective view illustrating other major parts of the disk apparatus according to the present invention.
Figure 5:
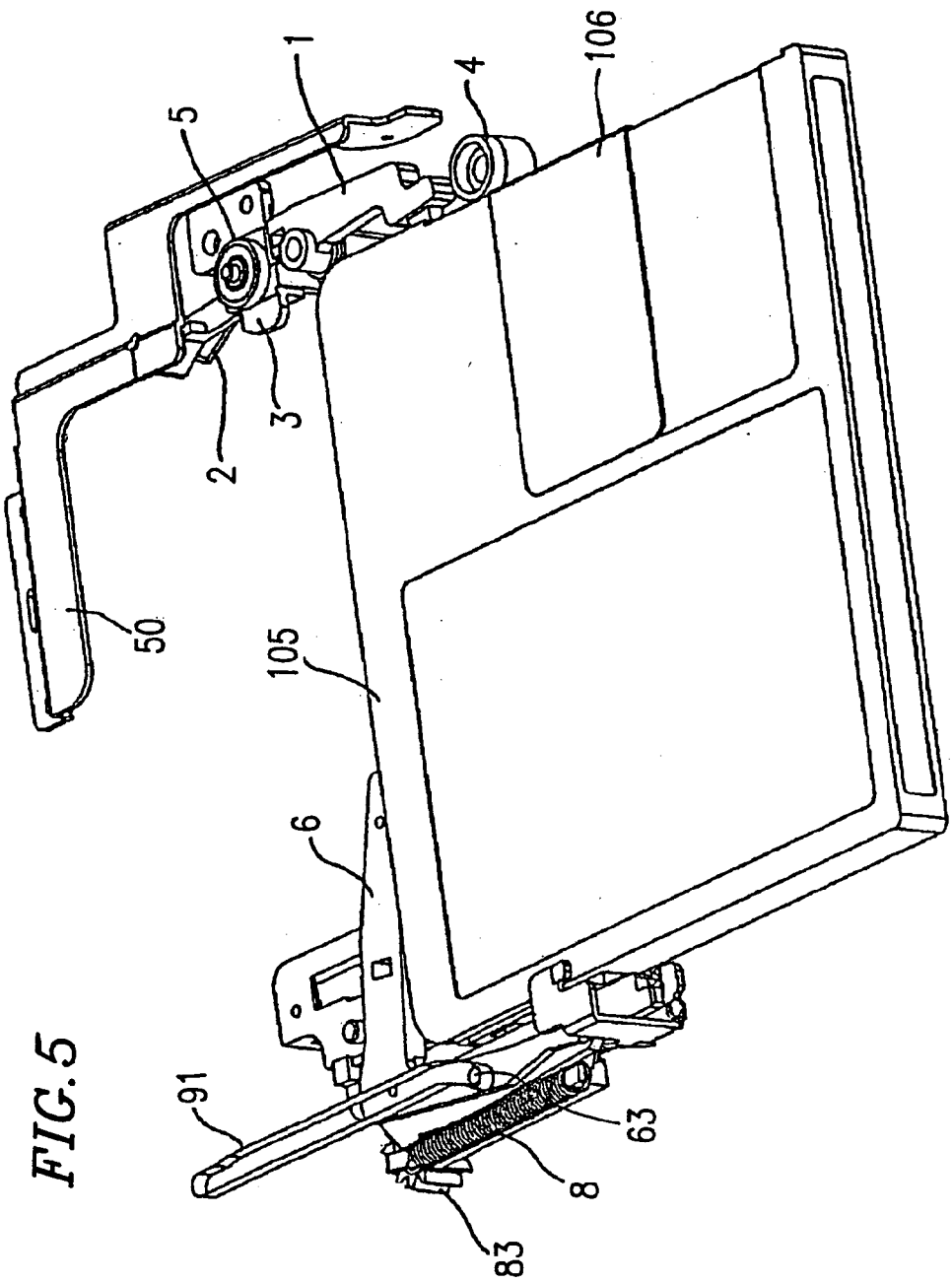
FIG. 5 is a perspective view illustrating major parts around the cartridge of the disk apparatus according to the present invention.

FIG. 3 is an exploded perspective view illustrating major parts in the right portion of a disk apparatus 100 according to the present invention. FIG. 4 is a perspective view illustrating major parts in the left portion of the disk apparatus 100. FIG. 5 is a perspective view illustrating some of the parts near the cartridge 105.

In FIG. 3, a traverse unit 40 is suspended from the rear side of a loading chassis 200 where one end of the traverse unit 40 is attached to and suspended from the rear side with a TR chassis rotating spring plate so that the traverse unit 40 can swing.

Figure 6A:
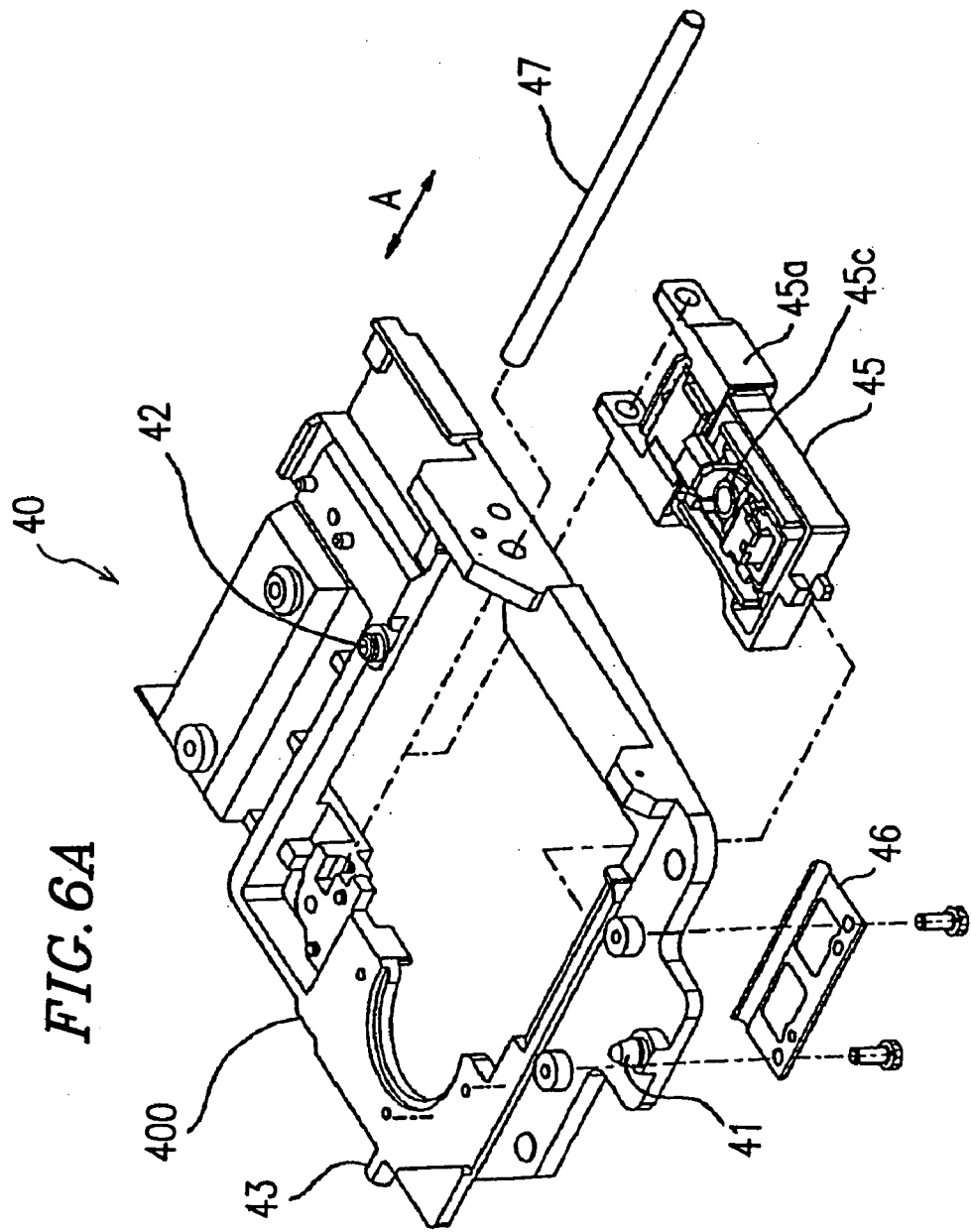
FIG. 6A is a perspective view illustrating a traverse unit of the disk apparatus according to the present invention.

FIG. 6A is a perspective view illustrating a configuration of the traverse unit 40. A pickup unit 45 is mounted on a traverse chassis 400 which includes a pair of bosses 41 and 42 for positioning the cartridge 105 (FIG. 1) and a control boss 43 on a side thereof.

The cartridge positioning bosses 41 and 42 engage with the positioning holes 109 and 110 of the cartridge 105 (FIG. 2), respectively, thereby determining the play position for the cartridge 105. The control boss 43 engages with a TR control cam 32 provided on an elevating rack 30 (FIG. 4) described below, thereby controlling swing operation of the traverse unit 40 with respect to the loading chassis 200.

Referring to FIG. 6A, the pickup unit 45 is supported on one end thereof using a pickup guide shaft 47 in such a manner that the pickup unit 45 can move in directions shown by arrow A. The other end of the pickup unit 45 is sandwiched between the traverse chassis 400 and a slider pressure plate 46.

FIG. 6B is an elevation view illustrating the traverse unit 40. FIG. 6C is an enlarged view of the C portion of FIG. 6B.

As shown in FIG. 6C, a pickup base 45a is joined with the traverse chassis 400 by engaging a TR groove 45b formed in an end portion of the pickup base 45a with a TR rail 400a having a smaller size than that of the groove width on the traverse chassis 400. The pickup base 45a is biased downward of the disk apparatus by the slider pressure plate 46 fixed on the traverse chassis 400.

FIG. 6D is a plan view of the traverse unit 40 viewed from the front side of the disk apparatus. Reference numeral 49 indicates a pickup driving motor; 48 a pickup driving shaft; and 40a a spindle motor. In FIG. 6D, the pickup unit 45 is driven by a pickup driving motor 49 rotating a pickup driving shaft 48 via a gear so that the pickup unit 45 is moved in a direction shown by arrow F. Here, one end of the pickup unit 45 is guided by the pickup guide shaft 47, and the other end is guided by the TR rail 400a (FIG. 6C) on the traverse chassis 400 while being biased by the slider pressure plate 46 downward in the disk apparatus.

Referring to FIG. 3, a right pressure lever 50 has one end thereof which is sandwiched between a pressure lever fixing piece 50a and a loading chassis 200. The right pressure lever 50 is mounted on the loading chassis 200 in such a manner that the lever 50 can swing. A shutter closer 1 is provided on the loading chassis 200 in such a manner that the closer 1 is free to rotate.

The right pressure lever 50 is linked via a right pressure lever spring 52 to the traverse unit 40. When the distance between the right pressure lever 50 and the traverse unit 40 is smaller than when the right pressure lever 50 and the traverse unit 40 are in a neutral position where the right pressure lever spring 52 is not biased, they are biased to attract each other. When the distance is greater than in the neutral position, they are biased to repel each other. The operation in this situation is illustrated in FIGS. 6E and 6F.

FIG. 6E shows the case where the distance between the right pressure lever 50 and the traverse unit 40 is greater than when the right pressure lever 50 and the traverse unit 40 are in the neutral position. In this case, as shown in FIG. 6E, the right pressure lever spring 52 applies force in the direction shown by arrow G2 to the traverse unit 40 and force in the direction shown by arrow G1 to the right pressure lever 50. Therefore, the traverse unit 40 and the right pressure lever 50 are biased to repel each other.

FIG. 6F shows the case where the distance between the right pressure lever 50 and the traverse unit 40 is smaller than when the right pressure lever 50 and the traverse unit 40 are in the neutral position. In this case, as shown in FIG. 6F, by the right pressure lever spring 52, force in the direction shown by arrow H1 is applied to the traverse unit 40 while force in the direction shown by arrow H2 is applied to the right pressure lever 50. Therefore, the traverse unit 40 and the right pressure lever 50 are biased to attract each other.

Figure 7A:
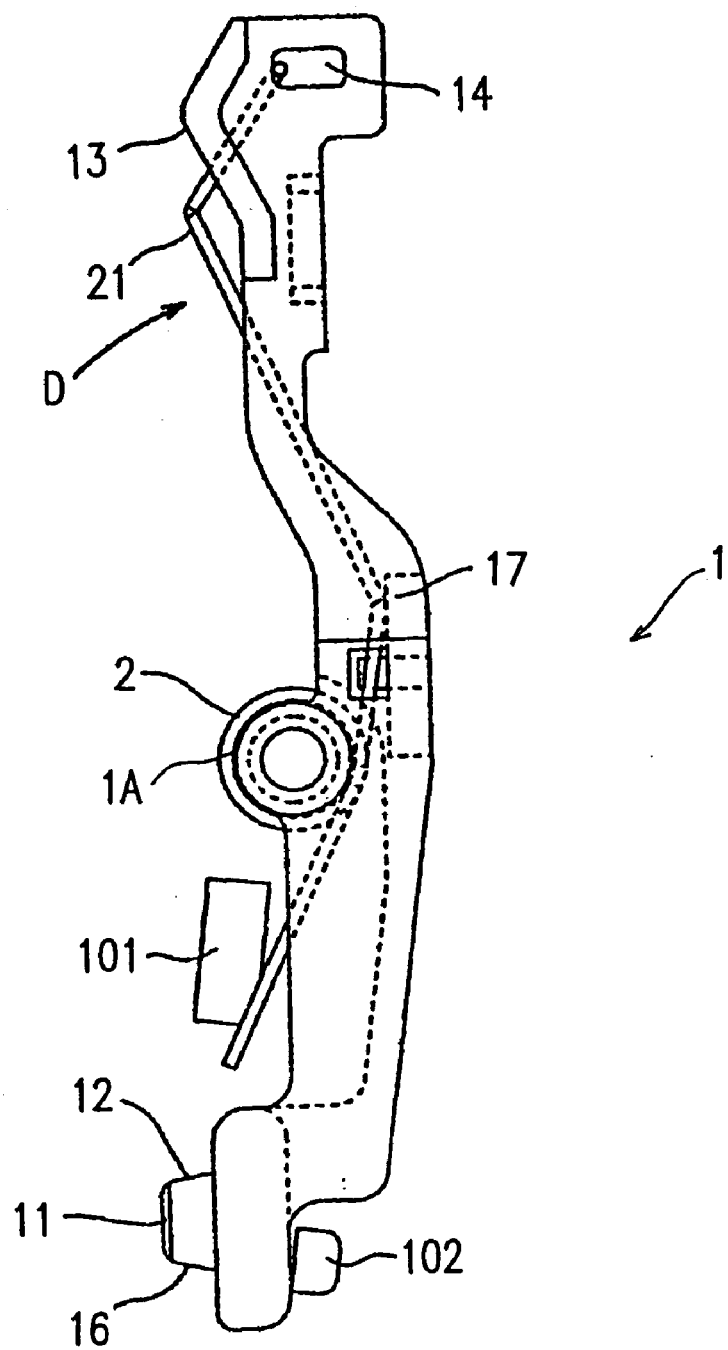
FIG. 7A is a diagram illustrating a configuration of a shutter closer of the disk apparatus according to the present invention.

Referring to FIG. 7A, a closer hook 11 and a rotation controlling portion 13 are provided in the shutter closer 1. The closer hook 11 includes a slope portion 12 formed at one end thereof and a protection wall 16 formed at the other end thereof. A shutter closer spring 2 is mounted around a boss 1A of the shutter closer 1, the boss 1A playing a role as the center of rotation of the shutter closer 1. One end of the shutter closer spring 2 is stopped by a stopper boss 101 provided on the loading chassis 200 while the other end is held via a bend portion 21 by a rectangular hole 14. In this way, the shutter closer 1 is biased in the counterclockwise direction so as to be held by a stopper 102.

The shutter closer spring 2 is also stopped on a closer spring stopping portion 17 indicated by a dotted line in FIG. 7A. For this reason, when force represented by arrow D is applied to the bend portion 21, a clockwise moment is applied from the shutter closer spring 2 to the closer spring stopping portion 17 so that the shutter closer spring 2 is rotated in the clockwise direction while the holding of the shutter closing spring 2 via the rectangular hole 14 by the shutter closer 1 is not released.

In this case, the shutter closer 1 is biased in the clockwise direction by reactive force on a contact point of a spring stopping boss 15 and the shutter closer spring 2. Note that the shutter closer spring 2 is made of wire spring. The wire spring is less expensive, has a higher level of surfacial hardness, and is more resistant against wear than a plate spring. The wire spring has a lower coefficient of friction and therefore does not require surface coating for improving lubricity such as used for the plate spring.

Figure 7B:
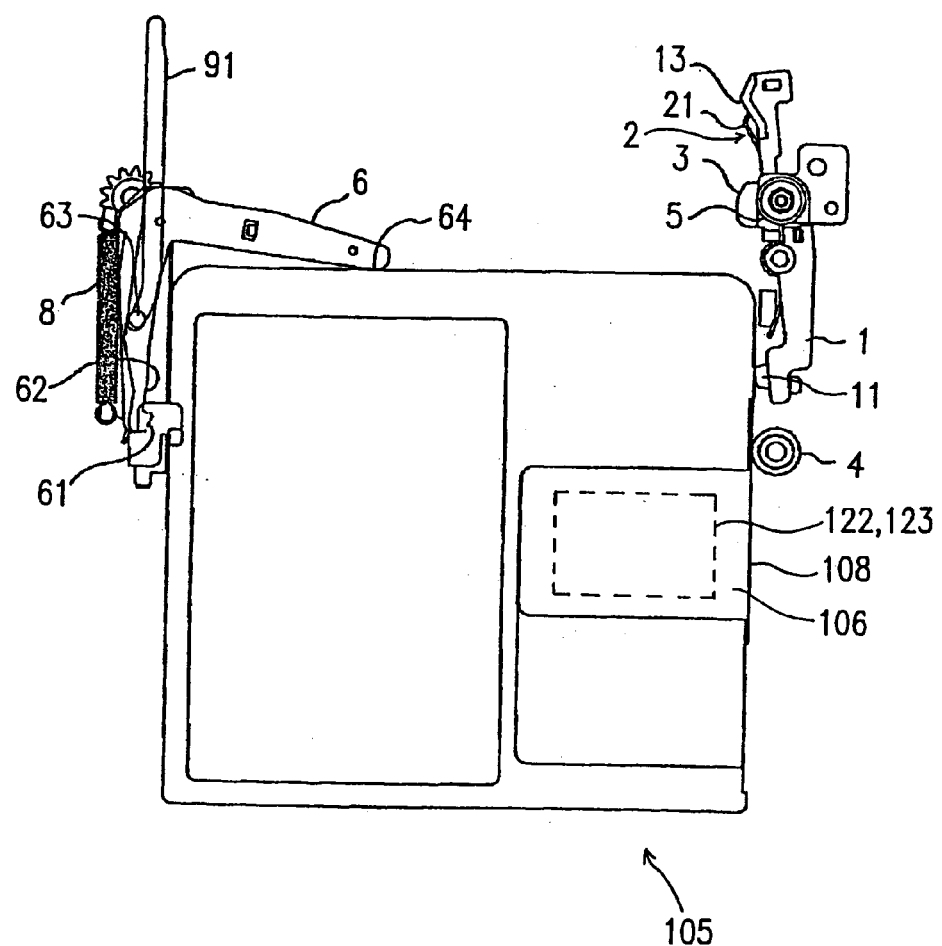
FIG. 7B is a plan view illustrating a cartridge removal position in the disk apparatus according to the present invention.

Referring to FIG. 7B, the leading rack 7 is provided on the left side of the cartridge 105 in such a manner that the rack 7 can slide forward and backward on the loading chassis. The leading rack 7 is driven by a driving means which is not shown. A leading arm 6 which is provided on the leading rack 7 is biased in the counterclockwise direction by an arm return spring 8. A leading hook 61 is provided at one end of the leading arm 6 so as to engage with the engagement portion 126 on the left side of the cartridge 105, thereby securely leading the cartridge 105 into the disk apparatus.

A cartridge pressure portion 62 is provided near the leading hook 61. The portion 62 plays a role in biasing the cartridge 105 toward the right side of the disk apparatus, i.e., toward the shutter member side, when the cartridge 105 is being loaded.

Referring to FIG. 5, a boss 63 is provided on the leading arm 6 so that the arm 6 is controlled by the cam groove 91 provided on the loading chassis. Note that the cam groove 91 is shown by its groove alone, not by the whole shape for the purpose of the simplicity.

Referring to FIG. 3, a shutter opener 3 is fixed on the loading chassis 200 in such a way as to cover the shutter closer 1. A first passive roller 5 is provided on the shutter opener 3 in such a manner that the shutter opener 3 is free to rotate. A second passive roller 4 is provided on the loading chassis 200 and at the front side of the shutter closer 1 in such a manner as to rotate freely.

A right cartridge guide 10 shown in FIG. 3 sandwiches the right side of the cartridge 105 with the loading chassis 200 in loading the cartridge 105 so to guide the cartridge 105. A slot for inserting the cartridge 105 into the disk apparatus has a right slope portion 10a and a right upper slope portion 10b. The loading chassis 200 also has a lower slope portion 200d.

The left side portion of the loading chassis 200 is shown in FIG. 4.

Referring to FIG. 4, the elevating rack 30 includes the TR control cam 32 which engages with the control boss 43 (FIG. 3) to control the movement of the traverse unit 40. The rack 30 further includes a gear 30A on the side opposite to the cam 32 and a stopping cam 34 on the center thereof.

The leading arm 6 is mounted on the leading rack 7 by the arm return spring 8. The leading rack 7 is provided on the loading chassis 200 in such a manner that the leading rack 7 can slide forward and backward.

FIGS. 8 and 9 are a detailed perspective view, and a perspective view from the rear side, respectively, illustrating the leading arm 6 and the leading rack 7. The leading arm 6 has a U-shaped groove 65 on the rear side thereof, and is biased by the arm return spring 8 in the counterclockwise direction when viewed from above the disk apparatus, around a leading boss 73 on the leading rack 7.

A guide groove 74 is formed on the rear side of the leading rack 7. Bosses 200a, 200b, and 200c (FIG. 4) on the loading chassis 200 engage with the guide groove 74 so that the leading rack 7 is mounted on the loading chassis 200 in such a manner that the rack 7 can slide forward and backward. A gear portion 7A engages with a rack transporting gear 85 so that the rack 7 is driven forward and backward.

The leading arm 6 includes the leading hook 61, the cartridge pressure portion 62, the boss 63, and the cartridge pushing portion 64. The leading hook 61 engages with the engagement portion 126 (FIG. 2) of the cartridge 105 so as to prevent the loaded cartridge 105 from coming out of the disk apparatus.

The cartridge pressure portion 62 biases the cartridge 105 toward the right side of the disk apparatus by the force of the arm return spring 8 in loading the cartridge 105, thereby obtaining highly reliable loading operation.

The boss 63 engages with the arm control cam (i.e., cam groove 91 shown in FIG. 5) formed on the rear side of the left cartridge guide 9 (FIG. 4) fixed on the loading chassis 200 so that the boss 63 controls the movement of the leading arm 6 in loading the cartridge 105 into the disk apparatus.

After the operation of removing the cartridge 105, the cartridge pushing portion 64 further pushes the cartridge 105 toward outside the disk apparatus so as to make it easy to remove the cartridge 105 from the disk apparatus.

The reason the leading arm 6 and the leading rack 7 are engaged in the U-shaped groove 65 is that when an impactive force is externally applied in a direction shown by arrow M in FIG. 9, only the leading arm 6 is retracted in the M direction so that breakage of the gear portion 7A of the leading rack 7 and the like can be avoided.

Figure 12:
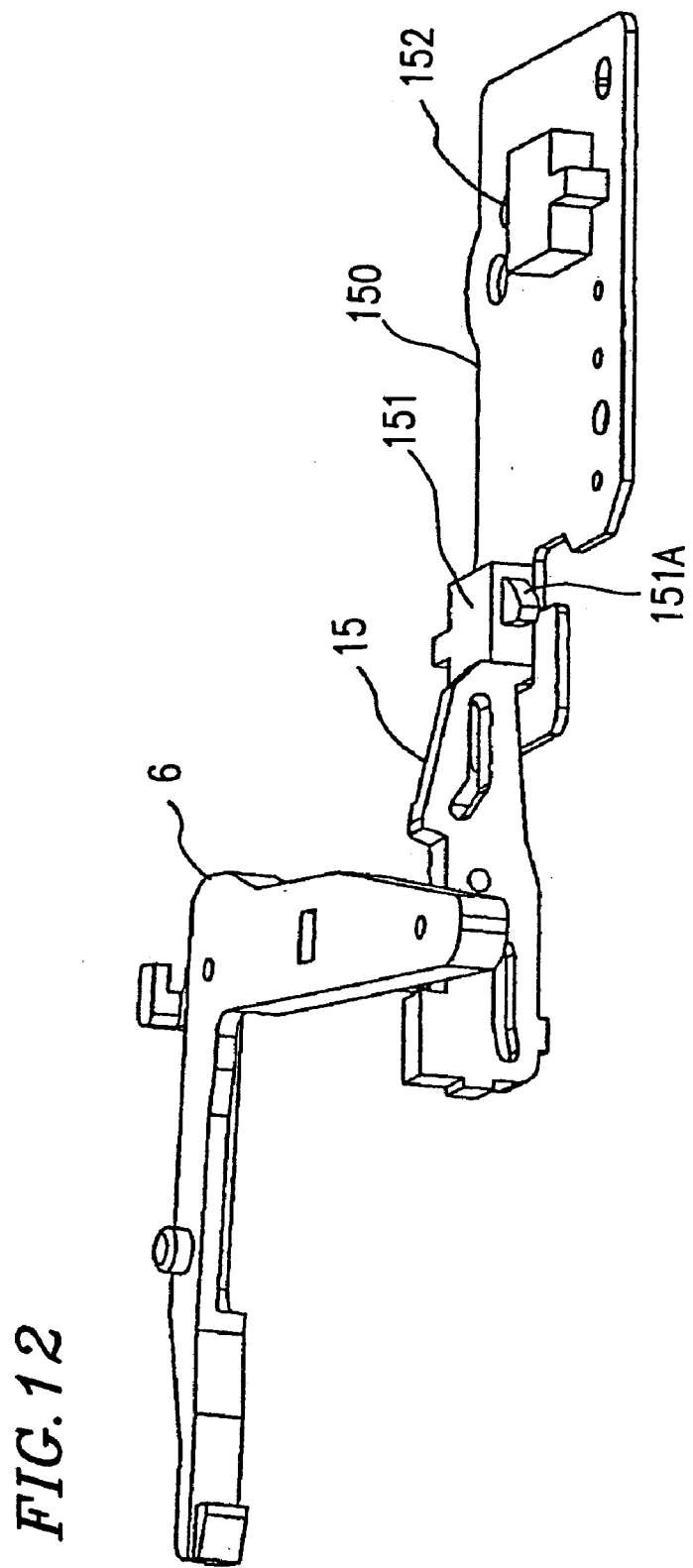
FIG. 12 is a perspective view illustrating the configuration around the switch rod of the disk apparatus according to the present invention.

FIGS. 10A, 10B, 11A, and 11B illustrate a configuration of a switch rod 15 (FIG. 4). FIG. 12 is a perspective view of the switch rod 15. As shown in FIGS. 10A and 10B, a switch rod 15 is mounted on bosses 215a and 215b provided on the groove of the loading chassis 200. The leading arm 6 has a rod driving portion 66 on the rear side thereof. When the leading arm 6 is moved toward the rear side of the disk apparatus, the state of the leading arm 6 changes from one shown in FIGS. 10A and 10B to one shown in FIGS. 11A and 11B. The switch rod 15 is moved according to the engagement of its cam portions 15A and 15B and the bosses 215a and 215b toward the rear side of the disk apparatus up to a predetermined position where the switch rod 15 switches ON an insertion detecting switch 151. Subsequently, the switch rod 15 is lowered, the cam portion departing from the trajectory of the leading arm 6.

Referring to FIGS. 4 and 13–16, a stopping arm 16 has a hole 16A at its center which is mounted on a boss (not shown) provided on the rear side of the loading chassis 200 in such a manner that the stopping arm 16 can rotate. A boss provided on one end of the stopping arm 16, which protrudes on the rear side of the stopping arm 16, engages with the stopping cam 34 of the elevating rack 30 to control movement of the stopping arm 16. The other end of the stopping arm 16 has a leading cam 16b for controlling movement of the leading rack 7 (FIG. 4).

Figure 17:
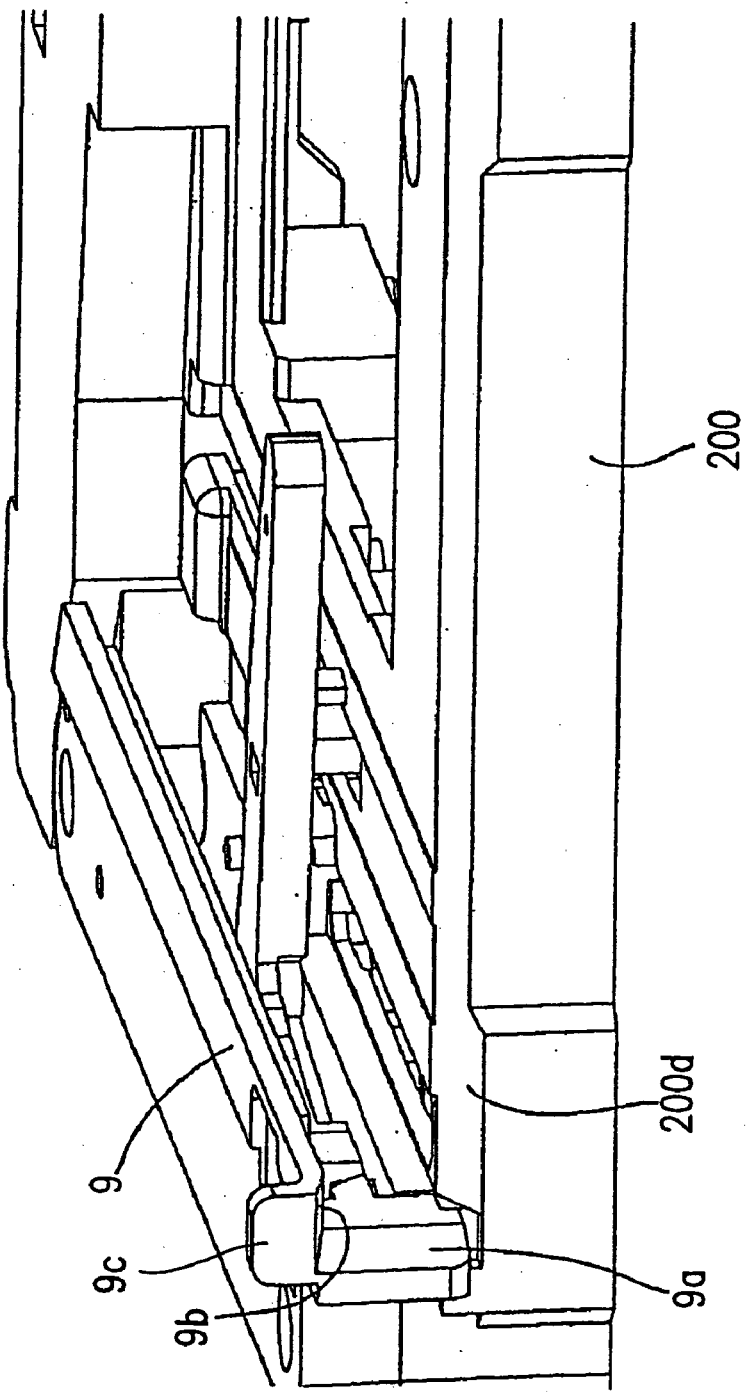
FIG. 17 is a perspective view illustrating a configuration around an slot of the disk apparatus according to the present invention.

Referring to FIG. 17, a left cartridge guide 9 sandwiches the left end of the cartridge 105 with the loading chassis 200 in loading the cartridge 105 so as to guide the cartridge 105. The slot for inserting the cartridge 105 has a left slope portion 9a and a left upper slope portion 9b.

Referring to FIG. 4, the elevating rack 30 includes elevating rack bosses 30a and 30b (FIGS. 13–16) thereon which are engaged in grooves (not shown) provided on the rear side of the loading chassis 200 so that the elevating rack 30 can slide in the forward and backward directions of the disk apparatus. Similarly, the guide groove 74 (FIG. 9) engages with the bosses 200a, 200b, and 200a on the loading chassis 200 so that the leading rack 7 can slide in the forward and backward directions of the disk apparatus.

Figure 14:
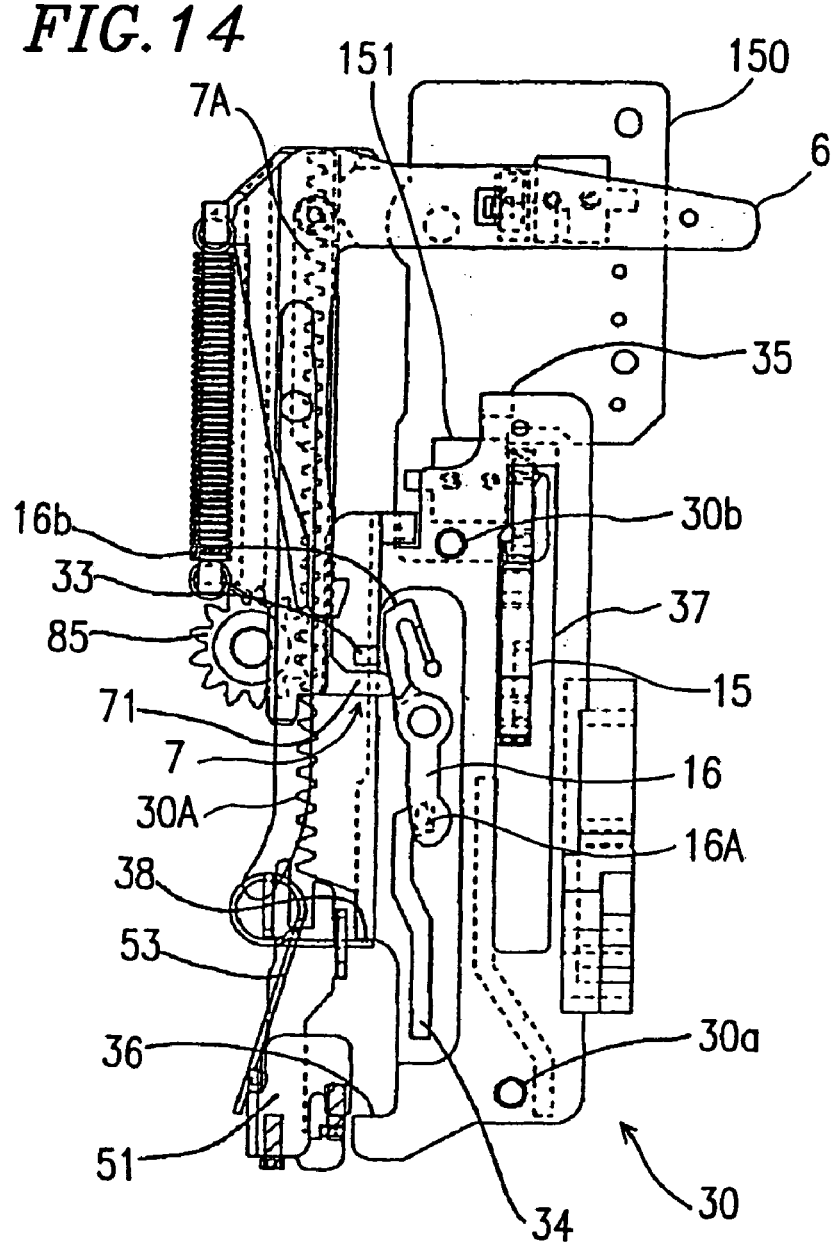
FIG. 14 is a plan view illustrating movement of the members around the elevating rack of the disk apparatus according to the present invention.

Referring to FIGS. 4, 9, and 14, the rack transporting gear 85 engages with the elevating rack 30 and the gear portion 7A (FIG. 9) of the rack 7 (FIG. 4) so that the elevating rack 30 can slide in the forward and backward directions of the disk apparatus.

Referring to FIGS. 4 and 10–12, a detecting switch unit 150 includes the insertion detecting switch 151 and a loading completion detecting switch 152. The insertion detecting switch 151 is switched ON by being pressed by the tip of the switch rod 15. The loading completion detecting switch 152 is switched ON by being pressed by a switch pressing portion 35 (FIG. 15) of the elevating rack 30.

The operation of the thus-constructed disk apparatus 100 will be described below.

Referring to FIGS. 7C and 17, when the cartridge 105 is inserted from the front side of the disk apparatus, the cartridge insertion portion, which has the right slope portion 10a and the right upper slope portion 10b, and the left slope portion 9a and the left upper slope portion 9b, and the lower slope portion 200d allows the cartridge 105 to be smoothly inserted into the disk apparatus by being guided by those slope portions.

When the cartridge 105 is not loaded, referring to FIGS. 7B, 10A and 10B, the leading arm 6 is controlled by the cam groove 91 to be rotated in the clockwise direction against the bias force of the arm return spring 8. That is, the leading hook 61 indicated with a dotted line in the figures is retracted leftward outside the cartridge 105. The rod driving portion 66 of the leading arm 6 is positioned in the groove 15C (FIGS. 10A and 10B). The shutter closer 1 is biased in the counterclockwise direction. The closer hook 11 is retracted rightward outside the cartridge 105.

Here, in the cartridge 105 holding portion on the front side of the disk apparatus the right and left cartridge guides 10 and 9 are not linked over the cartridge 105 as shown in FIGS. 7C and 17. Therefore, trouble due to a floating or peeling-off label is not likely to occur. The height dimension of the disk apparatus can be reduced because the disk apparatus holds only the right and left sides of the cartridge 105 which have the standardized height lower than the height of the label surface.

Figure 18:
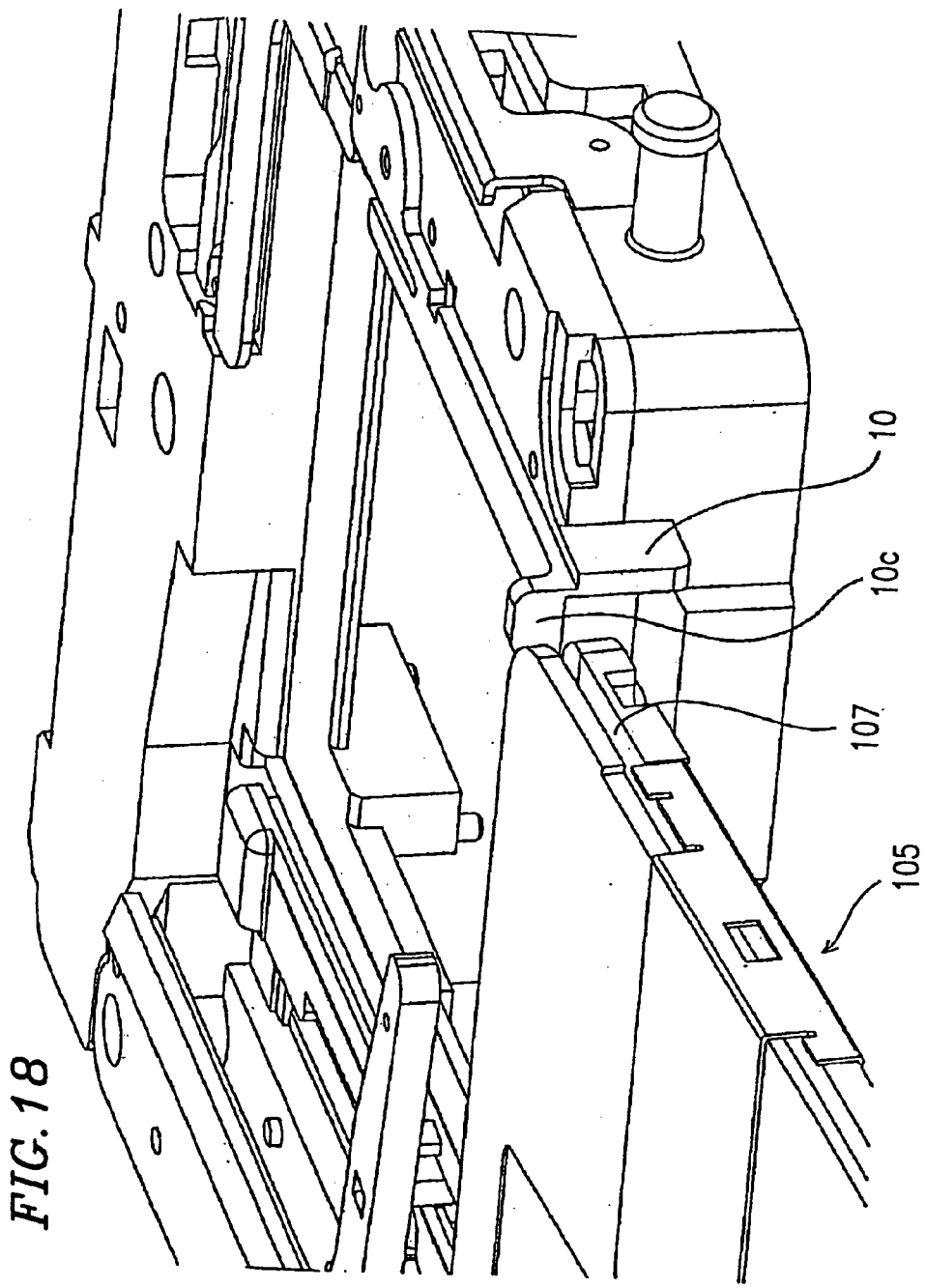
FIG. 18 is a diagram for explaining upward insertion preventing measures in the disk apparatus according to the present invention.

Referring to FIG. 18, when the cartridge 105 with the right side higher up than the left side or vice versa is inserted into the disk apparatus, either the right or left side of the cartridge 105 is shifted upward from the insertion slot of the disk apparatus. For example, the cartridge 105 is tilted in such a manner that the right end is higher up than the left end, the front end of the cartridge 105 strikes a right blocking piece 10c above the right cartridge guide 10 so that the cartridge 105 cannot enter the disk apparatus. The right blocking piece 10c has a dimension such that it cannot enter the guide groove 107, thereby preventing improper insertion of the cartridge 105. When the cartridge 105 is tilted in such a manner that the left end is higher up than the right end, the left blocking piece 9a similarly provided above the left cartridge guide 9 works in a similar way (FIG. 17). When the cartridge 105 is inserted while keeping its horizontal position but shifted upward, both the right and left blocking pieces work to prevent improper insertion of the cartridge 105.

Referring to FIG. 7B, when the cartridge 105 is inserted into the disk apparatus, the front end of the cartridge 105 presses the leading arm 6 which is in turn rotated in the counterclockwise direction according to control of the arm control cam 91 while stretching the arm return spring 8. The rotated leading arm 6 allows the leading hook 61 to engage with the engagement portion 126 of the cartridge 105 (FIG. 2).

In this case, the insertion detecting switch 151 for the driving means shown in FIGS. 4 and 11A is switched ON. Subsequently, the driving means drives the cartridge 105 toward the rear side of the disk apparatus using the leading hook 61.

In this case, the leading arm 6 is biased in the counterclockwise direction by the arm return spring 8 so that the cartridge 105 is biased in the right direction of the disk apparatus by the cartridge pressure portion 62. However, the right side of the cartridge 105 contacts and presses the second passive roller 4. The second passive roller 4 is rotated in association with movement of the cartridge 105 so that the cartridge 105 is transported toward the rear side of the disk apparatus. This arrangement allows the cartridge 105 to be biased toward one side of the disk apparatus so that passage position of the shutter member 106 is stable. Therefore, the shutter opening/closing arrangement works properly to secure the loading operation without misoperation.

Here, the boss 63 on the leading arm 6 does not contact either wall of the cam groove 91. In this case, the shutter opener 3 is inserted inside the guide groove 107 in the right side of the cartridge 105.

The engagement of the shutter opener 3 in the guide groove 107 prevents the cartridge 105 from coming out of the disk apparatus in the subsequent operation. Then the leading rack 7 is in the position when the cartridge 105 is unloaded.

Referring to FIG. 9, when a user inserts the cartridge 105 into the disk apparatus with great force, the leading rack 7 does not move as it is blocked by the rack transporting gear 85 linked to the driving means, whereas the leading arm 6 is retracted in the M direction as it engages with the leading rack 7 via the U-shaped groove. Therefore, the parts are unlikely to be damaged.

Referring to FIGS. 10A, 10B and 11A, 11B, the rod driving portion 66 of the leading arm 6 pushes a groove 15C of the switch rod 15 toward the rear side of the disk apparatus. The switch rod 15 is moved toward the rear side of the disk apparatus while being lowered in a direction shown by arrow A3, with the trajectory of the switch rod 15 being controlled by cams 15A and 15B. The switch rod 15 eventually switches ON the insertion detecting switch 151. FIGS. 11A and 11B show that the insertion detecting switch 151 is in the ON state. The switch rod 15 covers the whole insertion-detecting switch 151 so that force of the insertion detecting switch 151 returning in a direction shown by arrow E is blocked by the switch rod 15 contacting and pressing a wall of the switch 151 which is substantially perpendicular to the E direction. The insertion detecting switch 151 is thus kept in the ON state.

Following to this, as the switch rod 15 is lower than the leading arm 6, the leading arm 6 continues to go toward the rear side of the disk apparatus without getting snagged on the switch rod 15.

The switch rod 15 is lowered so that it departs from the leading arm 6. Therefore, the position of the switch rod 15 is not restricted with respect to the E direction. However, the above-described returning force of the switch rod 15 is substantially perpendicular to a direction shown by arrow F, so that the returning force has substantially no component force in the F direction. Frictional force caused by the returning force holds the switch rod 15.

The insertion detecting switch 151 has an actuator portion 151A which protrudes in the E direction (FIG. 10A). As shown in FIG. 11A, the switch rod 15 pushes the actuator portion 151A completely so as to prevent the actuator portion 151A from returning. The switch rod 15 has a degree of freedom in the F direction. Reactive force of the actuator portion 151A is applied to a side of the switch rod 15 which is perpendicular to the F direction. The pressure between the actuator portion 15A and the switch rod 15 produces frictional force at their interface. This frictional force maintains the position of the switch rod 15.

Referring to FIG. 14, when the insertion detecting switch 151 is switched ON, a driving motor (not shown) is actuated, followed by the rack transporting gear 85 being driven by the motor. The gear portion 7A (FIG. 9) of the leading rack 7 which is engaged in the rack transporting gear 85 allows the leading arm 6 to load the cartridge 105.

Figure 13:
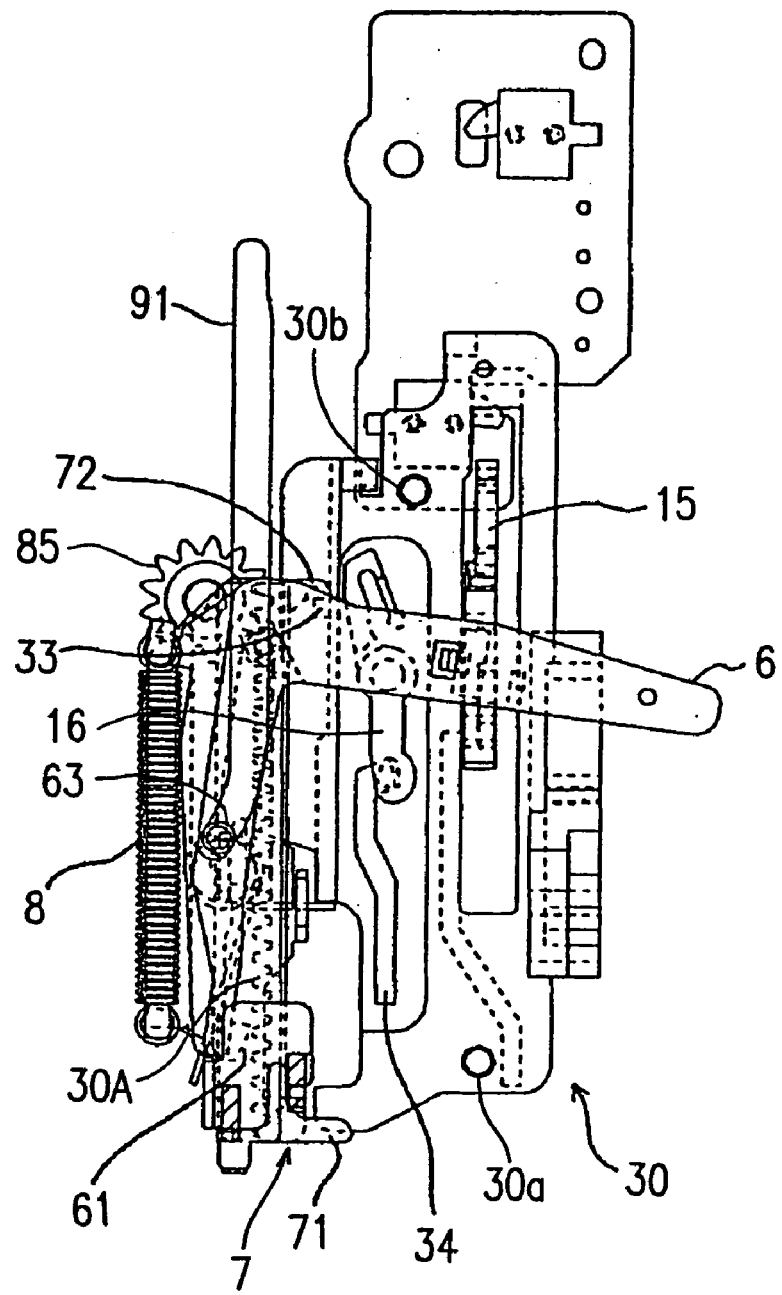
FIG. 13 is a plan view illustrating a configuration of members around an elevating rack of the disk apparatus according to the present invention.

In this case, referring to FIG. 13, the gear portion 30A of the elevating rack 30 is positioned apart from the rack transporting gear 85. As shown in FIG. 14, the elevating rack 30 is held by the boss 16A on the stopping arm 16 engaging with the stopping cam 34.

Figure 15:
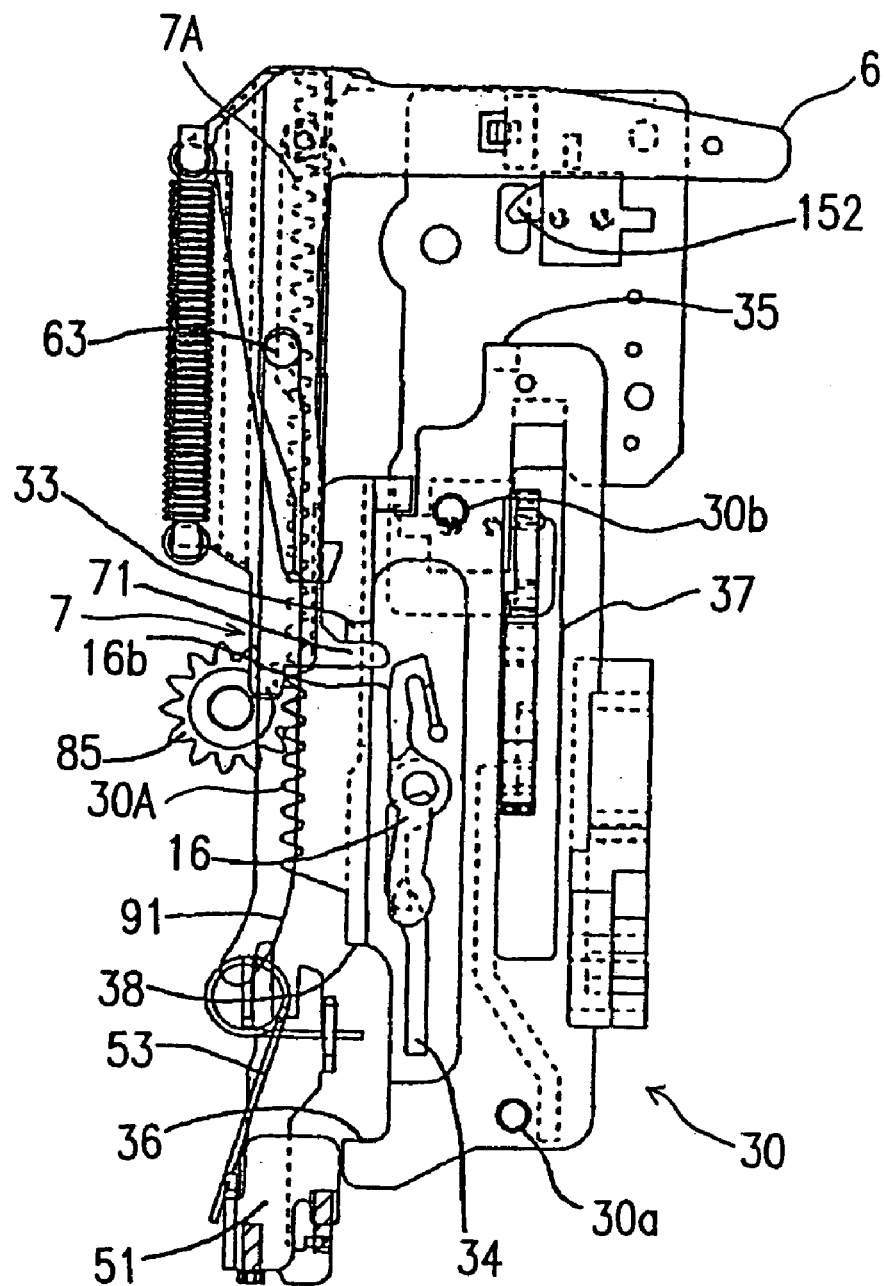
FIG. 15 is a plan view illustrating movement of the members around the elevating rack of the disk apparatus according to the present invention.

Referring to FIGS. 15 and 17, the leading arm 6 is controlled via the boss 63 by the arm controlling cam 91 on the left cartridge guide 9 (FIG. 4). Here, the groove width of the arm controlling cam 91 is broad so that the boss 63 does not contact either wall of the cam 91. Therefore, the counterclockwise bias force by the arm return spring 8 allows the cartridge 105 to be biased by the cartridge pressure portion 62 in the right direction of the disk apparatus.

In this case, referring to FIGS. 5 and 7B, the right side of the cartridge 105 contacts and presses the second passive roller 4. Movement of the cartridge 105 then rotates the second passive roller 4 which in turn smoothes the transportation of the cartridge 105 toward the rear side of the disk apparatus.

Here, the shutter opener 3 is inserted in the guide groove 107 (FIG. 1) in the right side of the cartridge 105.

Consider the case that a user accidentally inserts the cartridge 105 which is turned upside down and is also laterally reversed. The cartridge 105 has a groove in the left side thereof like the groove guide 107. The shutter opener 3 would be inserted into the groove. The groove is normally positioned above the middle of the left side of the cartridge 105, and when the cartridge 105 is turned down, is therefore positioned below the middle. When the improperly oriented cartridge 105 is inserted into the disk apparatus, the cartridge 105 is shifted upward.

Insertion of the right side of the cartridge 105 is regulated by the right cartridge guide 10. When the cartridge 105 is forcedly inserted between the shutter opener 3 and the right cartridge guide 10, some parts may be broken or the cartridge gets stuck so that the driving means cannot remove the cartridge 105 from the disk apparatus. To solve such problem, as shown in FIG. 7C, a crena 10d is provided in the right cartridge 10. The crena 10d is elastically bent by the forced insertion of the cartridge 105 so that the breakage of the parts is avoided.

Force caused by the elastically bending crena 10d pressing the cartridge 105 is sufficiently weak so that the driving force of the driving means can remove the cartridge 105 from the disk apparatus.

Figure 19:
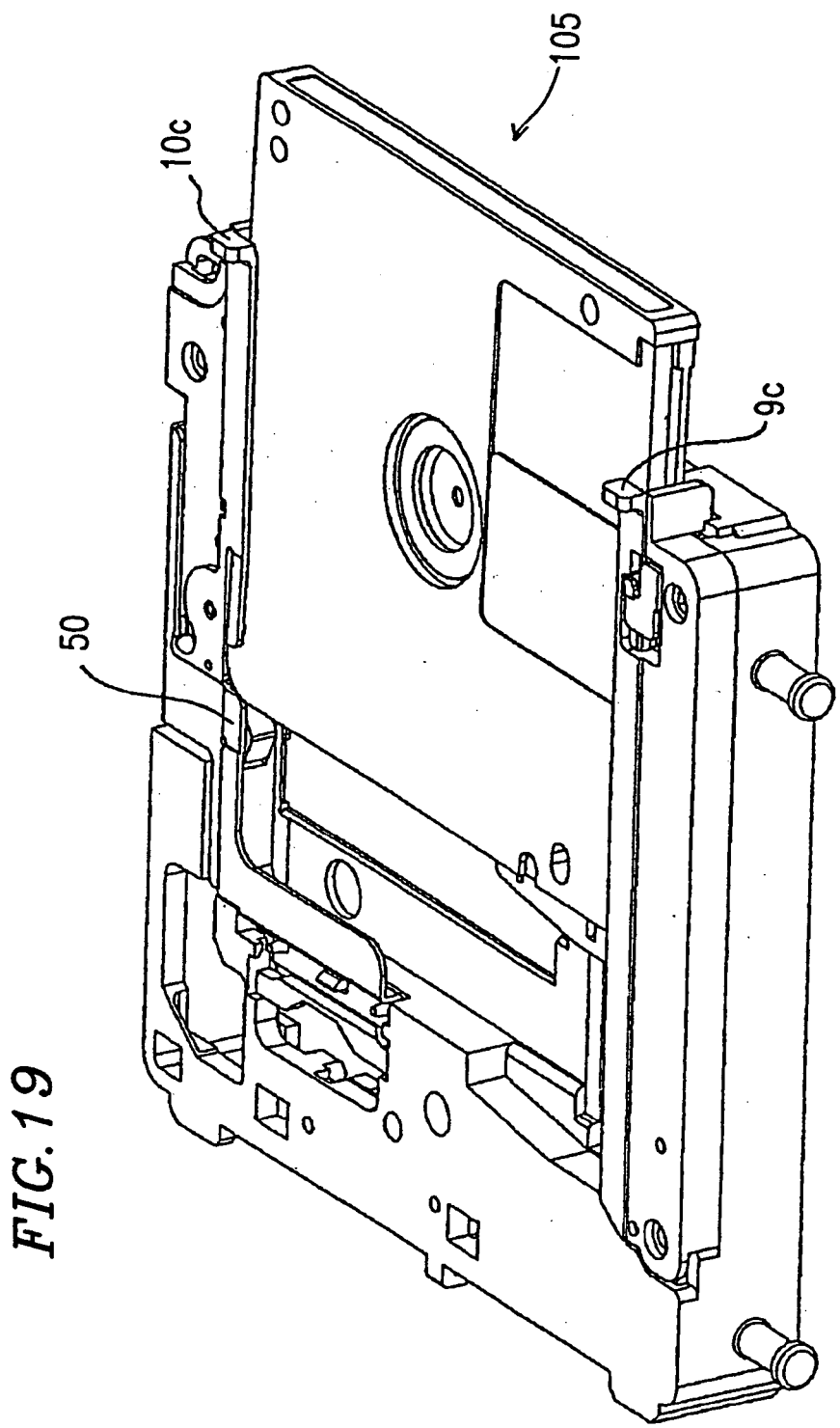
FIG. 19 is a diagram for explaining upside-down insertion preventing measures in the disk apparatus according to the present invention.

When the improperly-positioned cartridge 105 is inserted further inside the disk apparatus as shown in FIG. 19, the cartridge 105 gets stuck on the right pressure lever 50 so that the cartridge cannot go further. Then the whole cartridge 105 is completely inserted inside the disk apparatus and no longer suffers from user's undue force.

On the other hand, when accidentally inserting the cartridge 105 which is turned upside down and is reversed back to front, the cartridge 105 gets stuck on the shutter opener 3 because the right side of the cartridge 105 has no groove corresponding to the open-ended guide groove 107. Therefore, the cartridge 105 goes no further toward the rear side of the disk apparatus.

Figure 20A:
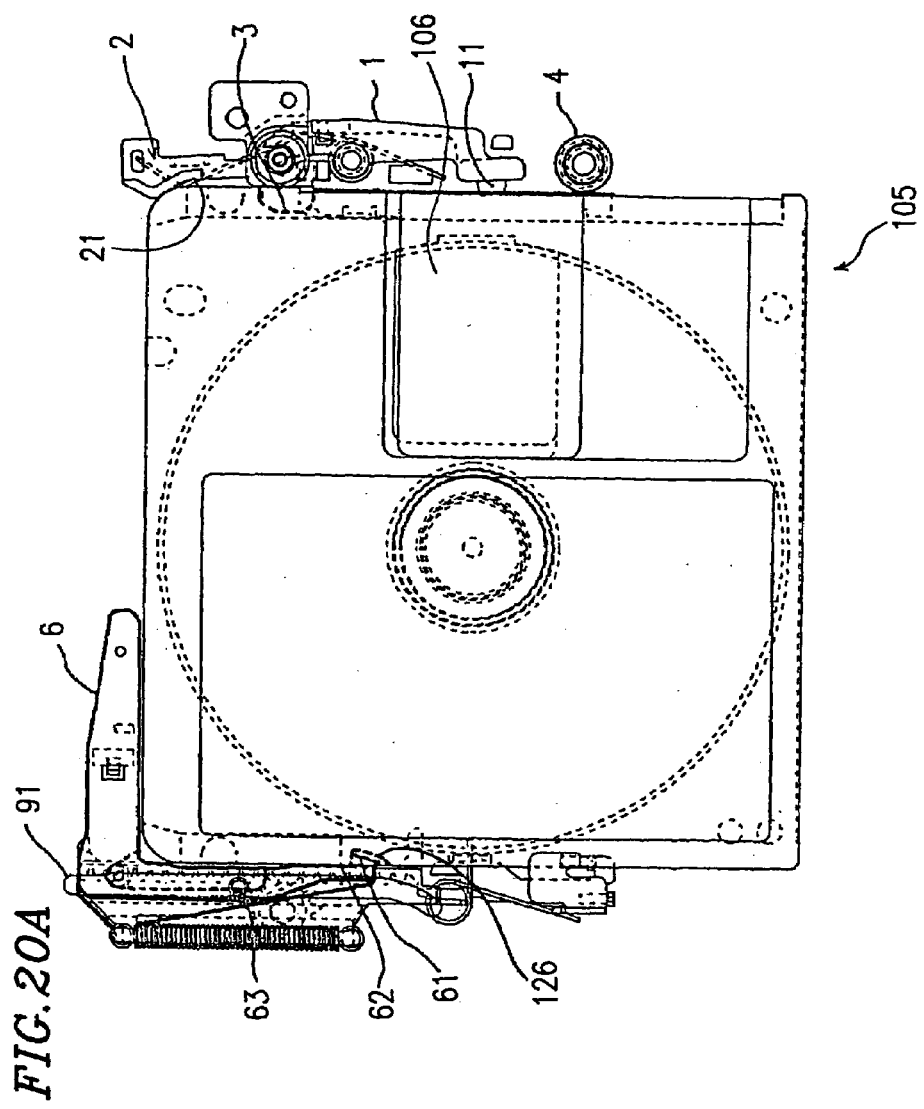
FIG. 20A is a plan view illustrating the major parts at a starting position of opening/closing a shutter of the disk apparatus according to the present invention.

Return to the normal operation. Referring to FIGS. 20A and 2, the cartridge 105 is inserted up to the shutter opener 3 which in turn strikes the lock arm 125c (FIG. 2) of the lock member 125 (FIG. 2) which accesses the guide groove 107 from the inside. The shutter opener 3 pushes the lock arm 125c against its bias force toward inside the cartridge 105 and then the lock arm 125c is elastically deformed so that the locked state of the shutter member 106 is released. The shutter opener 3 then strikes the supported plate 106B (FIG. 1) of the shutter member 106, and prevents the cartridge 105 from going further but allows the cartridge 105 to be moved further toward the rear side of the disk apparatus. Accordingly, the openings 122 and 123 are opened. FIG. 20A shows the starting state of the opening operation of the openings 122 and 123.

As shown in FIG. 20A, when the cartridge 105 is still further moved toward the rear side of the disk apparatus, the right front end of the cartridge 105 strikes the bend portion 21 of the shutter closer spring 2. Then the shutter closer 1 rotates in the clockwise direction against bias force of the shutter closer spring 2 followed by the closer hook 11 being engaged into the shutter closing hole 108 (FIG. 1) of the shutter member 106.

As shown in FIG. 7A, the shutter closer 1 is biased in the counterclockwise direction by the shutter closer spring 2 being engaged in the spring stopping hole 14 when the cartridge 105 is unloaded. When the cartridge 105 contacts and presses the bend portion 21, as sown in FIG. 20A, the shutter closer 1 rotates integrally with the bend portion 21 since clockwise moment as reactive force by the shutter closer spring 2 is applied to the contact point of the spring stopping boss 15 with the shutter closer spring 2.

Figure 20B:
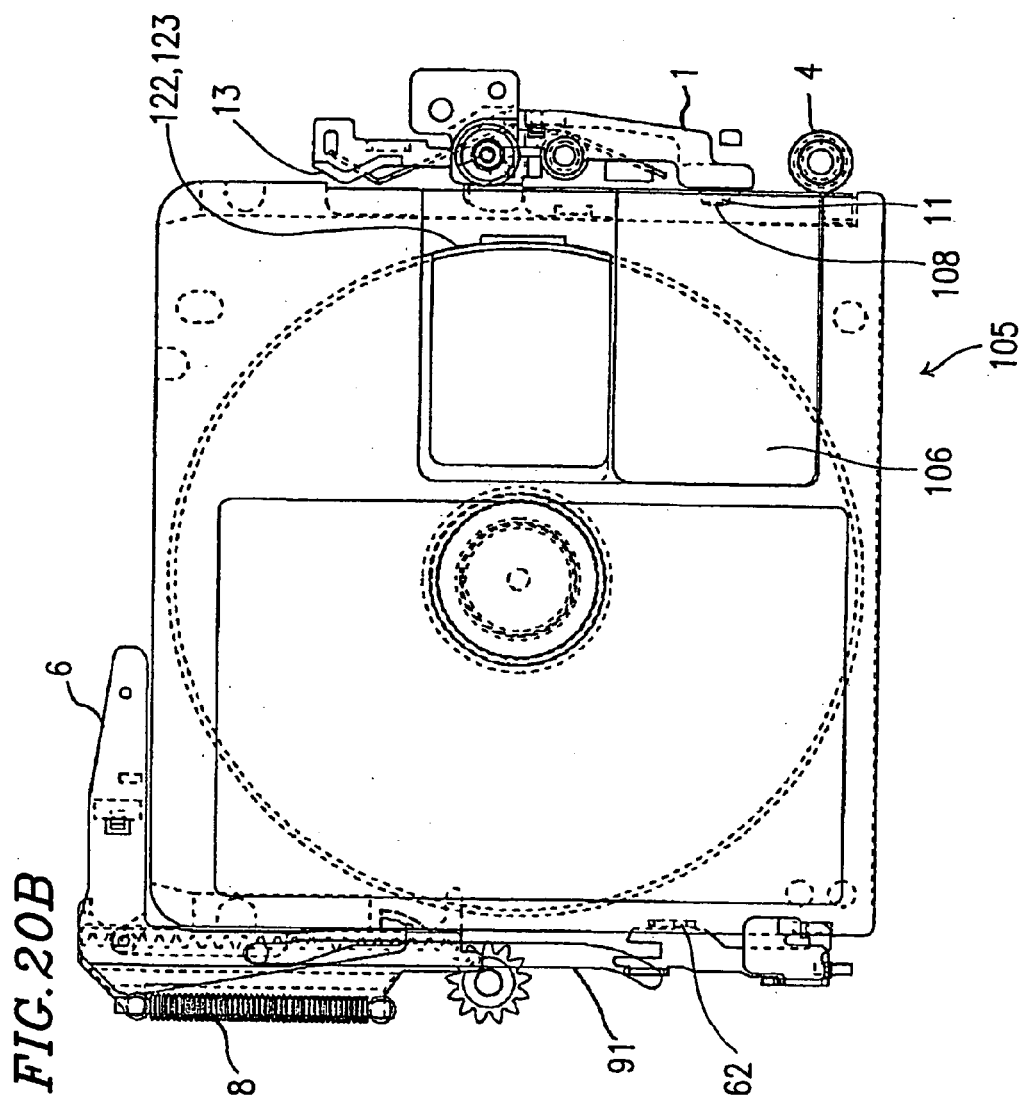
FIG. 20B is a plan view illustrating the major parts at a play position of the disk apparatus according to the present invention.
Figure 20C:
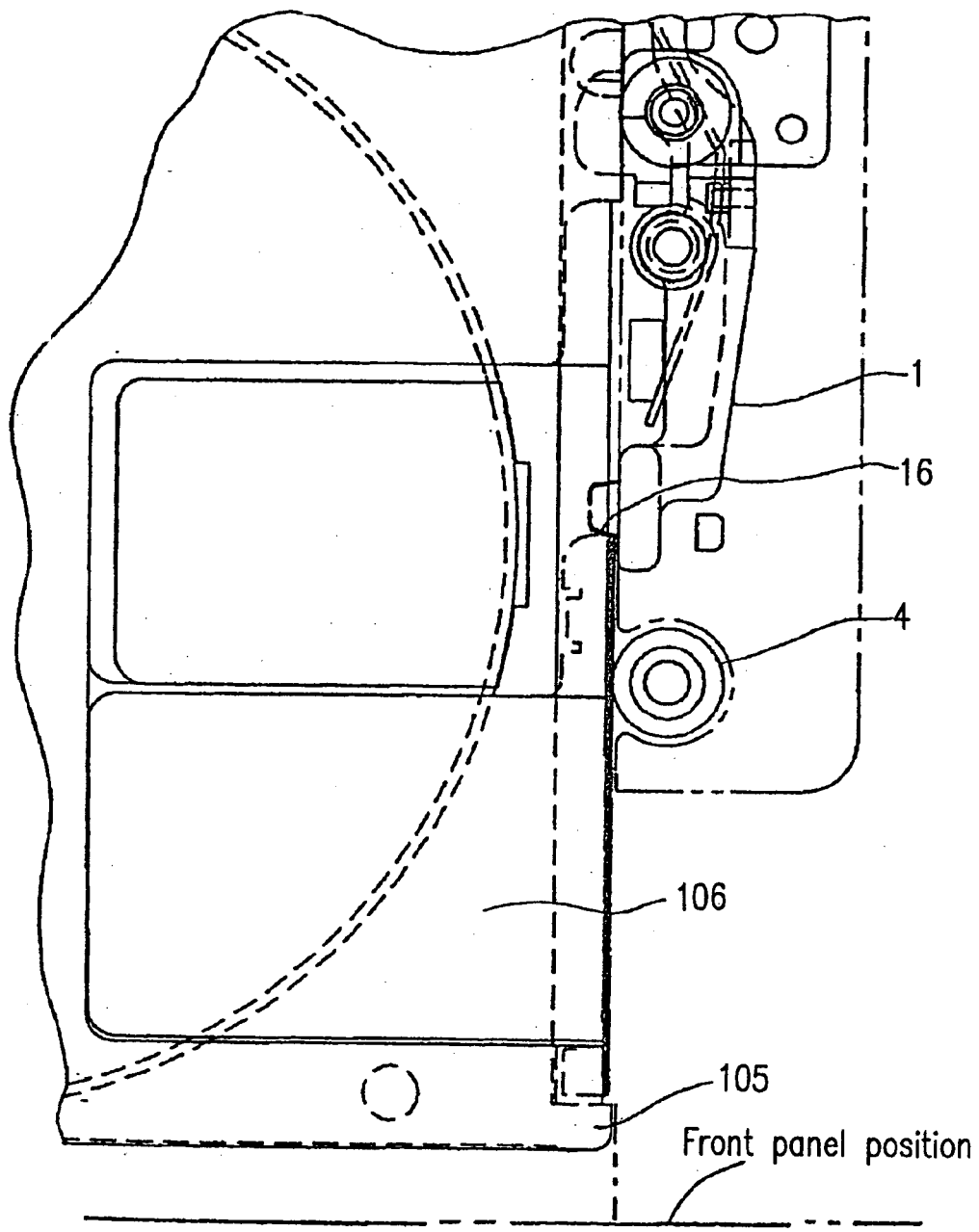
FIG. 20C is a plan view illustrating a function of the shutter closer in misoperation of the disk apparatus according to the present invention.
Figure 20D:
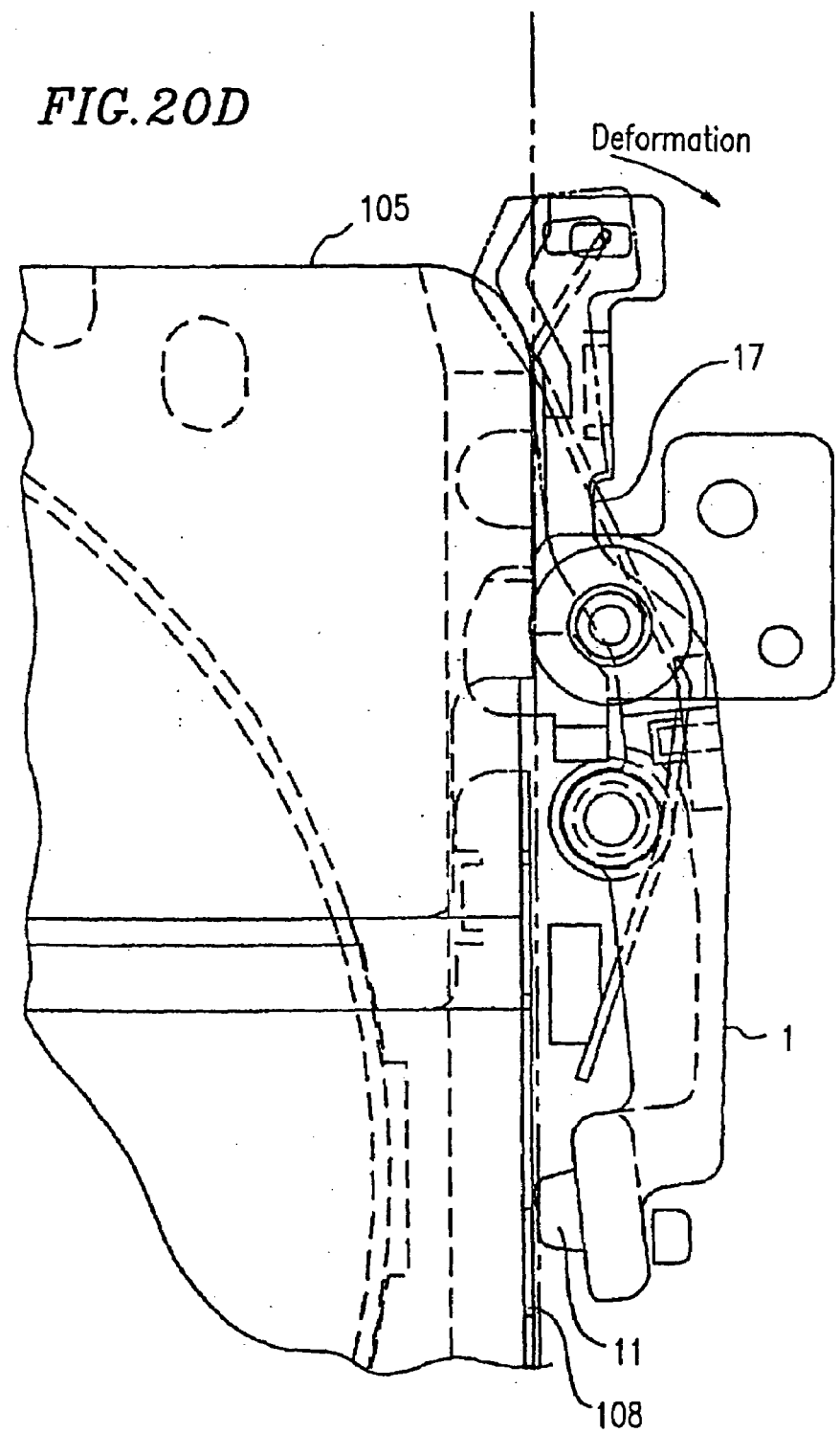
FIG. 20D is a plan view illustrating a bend of the shutter closer in misoperation of the disk apparatus according to the present invention.

When the cartridge 105 to be inserted has the shutter member 106 that is completely opened by accident, the shutter member 106 gets stuck on the protection wall 16 of the closer hook 11 as shown in FIG. 20C since the wall 16 is in the shape of the trajectory of the rotating shutter closer 1, thereby preventing the cartridge 105 from being loaded. As is apparent from the front panel position of the disk apparatus shown in FIG. 20C, the shutter member 106 does not get stuck on the protection wall 16 until the cartridge 105 is completely inside the disk apparatus. Therefore, breakage of the parts by a user inserting the cartridge 105 with great force can be avoided. The parts such as the shutter closer 1 have sufficient strength that the driving force of the driving means cannot damage the parts as shown in FIG. 20D.

Referring to FIG. 20B, the cartridge 105 is subsequently transported further toward the rear side of the disk apparatus and the right side of the cartridge 105 then strikes the rotation controlling portion 13. This allows the closer hook 11 to engage with the shutter closing hole 108 (FIG. 1). At the same time, the cartridge 105 is biased toward the right direction thereof by the cartridge pressure portion 62 on the left side of the cartridge 105. The first and second passive rollers 5 and 4 on the right side of the cartridge 105 guide the cartridge 105 along a trajectory drawn by the circumference of the rollers. Thus, the cartridge 105 is smoothly moved while the openings 122 and 123 are being opened.

When the cartridge 105 reaches in the play position, the openings 122 and 123 are completely opened.

In the above-described inserting operation, when inserting the cartridge 105 in which the shutter member 106 is slightly opened by accident, i.e., the openings 122 and 123 are halfway opened, the closer hook 11 strikes the rotation controlling portion 13 without engaging with the shutter closing hole 108. In this case, since the shutter closer 1 has a bend portion as shown in FIG. 7A, the shutter closer 1 itself is elastically deformed, thereby avoiding breakage of the parts.

Figure 20E:
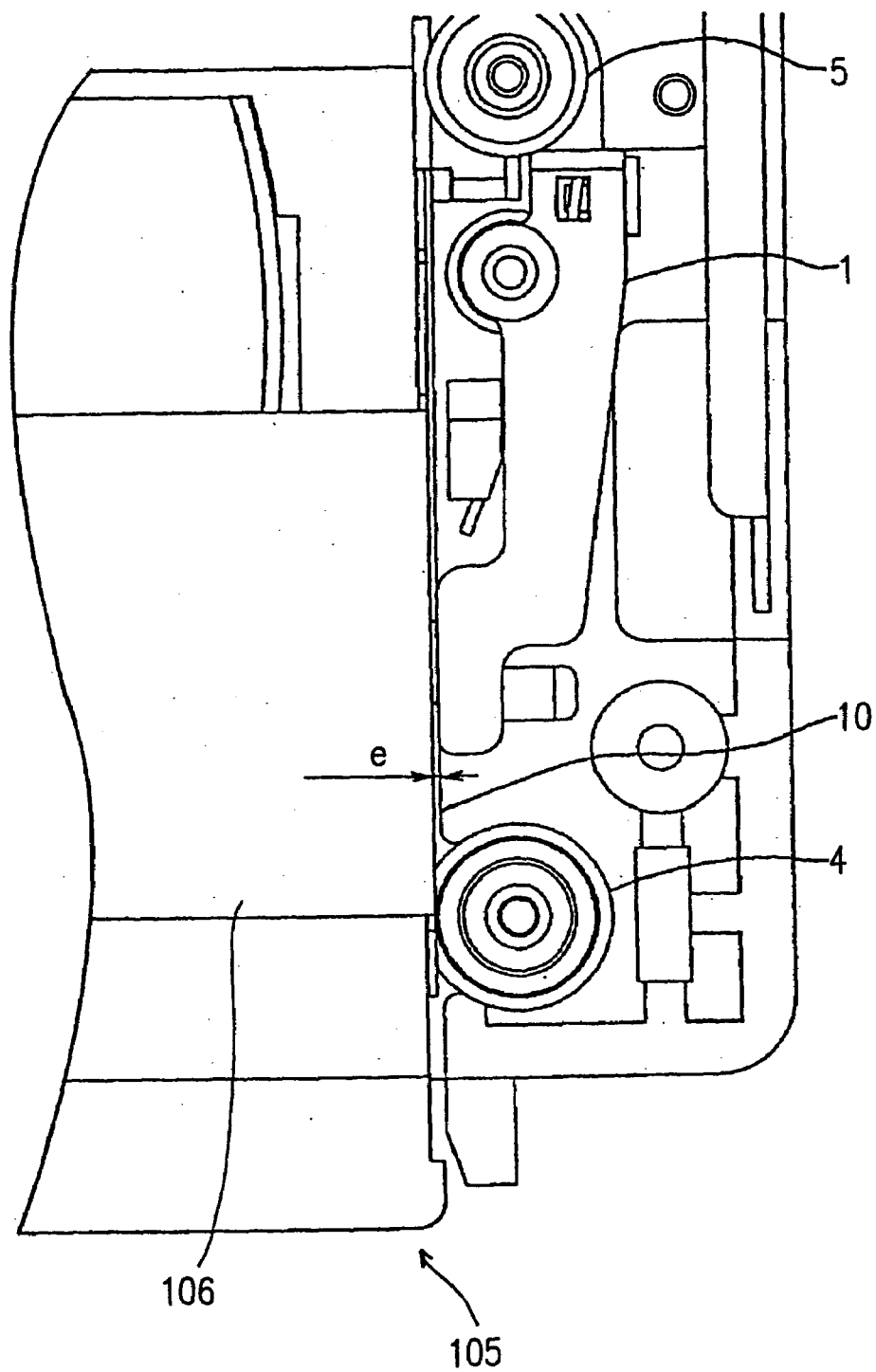
FIG. 20E is an enlarged view illustrating portions around the shutter member of the disk apparatus according to the present invention.

Referring to FIG. 20E, the right side of the cartridge 105 moving inside the disk apparatus contacts only the circumferences of the first and second passive rollers 5 and 4. In other words, there are no parts that enter inward from the circumferences of the first and second passive rollers 5 and 4 contacting the cartridge 105. The right cartridge guide 10 is apart by the distance e from the right side of the cartridge 105 guided by the first and second passive rollers 5 and 4. This arrangement allows the cartridge to be loaded without getting stuck when the shutter member 106 of the cartridge 105 has burrs on the right side thereof. This is because among the parts of the disk apparatus only the first and second rollers 5 and 4 contact the burrs.

When the cartridge 105 reaches in the play position, the openings 122 and 123 are completely opened as shown in FIG. 20B.

Referring to FIG. 14, when the leading rack 7 (FIG. 4) is further transported in the rear side of the disk apparatus, a rack loading hook 71 on the leading rack 7 strikes a rack driving boss 33 on the elevating rack 30 and pushes the elevating rack 30 toward the rear side of the disk apparatus. The stopping arm 16 engaging with the elevating rack 30 is forcedly rotated in the clockwise direction so that the holding of the elevating rack 30 by resin elasticity of the stopping arm 16. In this case, the gear portion 7A (FIG. 9) of the leading rack 7 and the gear portion 30A of the elevating rack 30, which have been so far separated from each other, have the same phase and start to engage with each other. The elevating rack 30 is then transported with the same rack transporting gear 85.

Referring to FIG. 15, the leading rack 7 and the elevating rack 30 are further transported toward the rear side of the disk apparatus. When the cartridge reaches the play position, the engagement of the gear portion 7A of the leading rack 7 with the rack transporting gear 85 is released. Thereafter, only the elevating rack 30 is further transported by its engagement with the rack transporting gear 85 toward the rear side of the disk apparatus, and eventually gets into the state shown in FIG. 15.

Here, the boss 63 of the leading arm 6 is engaged in the rear end of the controlling cam 91, i.e., the portion having the narrow groove width. Now there is no longer the force that has biased the cartridge 105 toward the right side via the cartridge pressure 62 according to the force of the arm return spring 8 without being regulated by the controlling cam 91, i.e., the force that has biased the cartridge 105 which is transported on the circumferences of the rollers 4 and 5 on the right side thereof. The cartridge 105 may wobble laterally.

Figure 16:
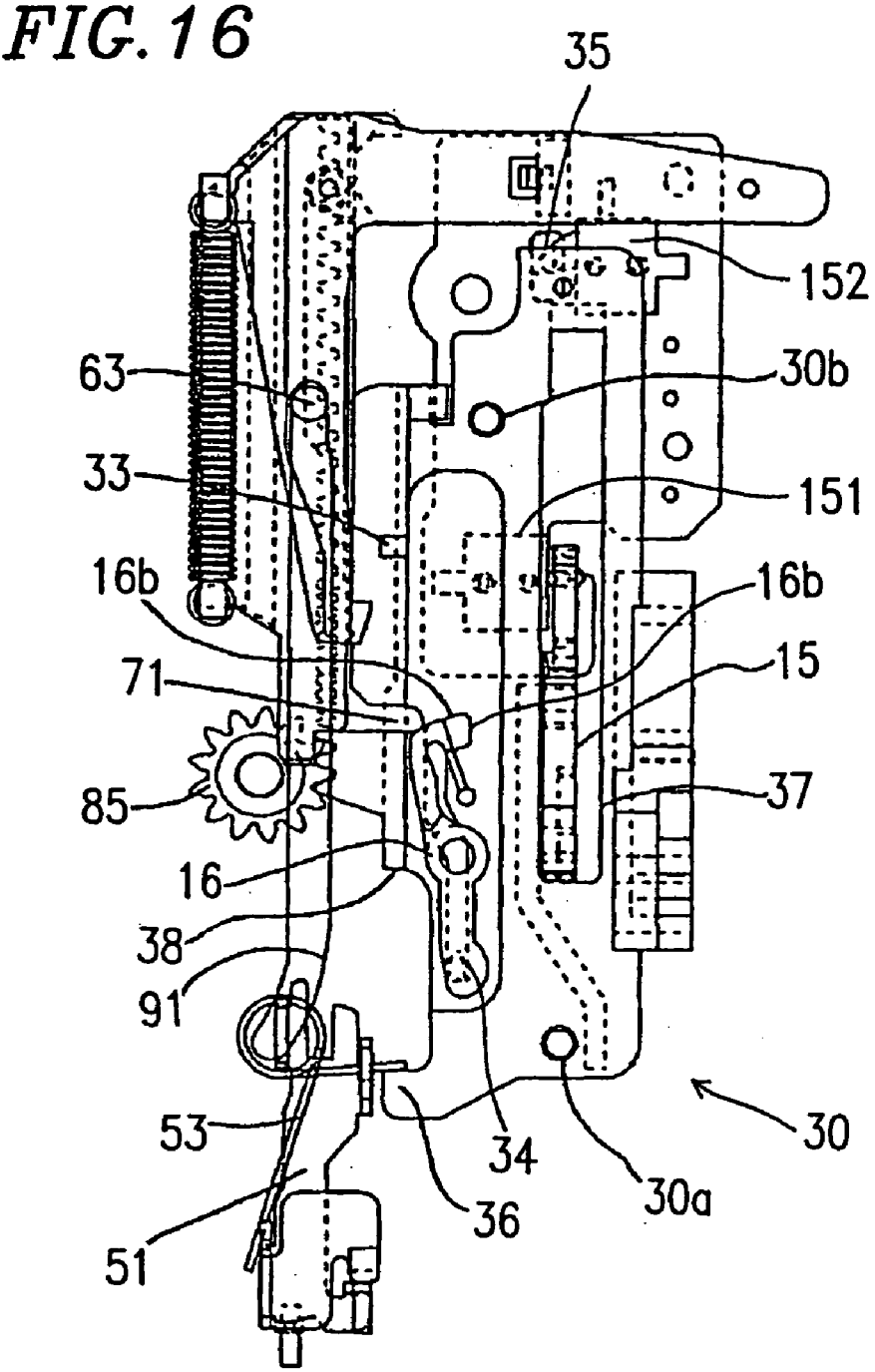
FIG. 16 is a plan view illustrating movement of the members around the elevating rack of the disk apparatus according to the present invention.

Referring to FIGS. 15 and 16, as the elevating rack 30 is further transported toward the rear side of the disk apparatus, the engagement of the stopping cam 34 and stopping arm 16 on the elevating rack 30 changes from the state shown in FIG. 15 to the state shown in FIG. 16. The stopping arm 16 is rotated in the counterclockwise direction so that the leading cam 16b gets snagged on the rack loading hook 71 of the leading rack 7. This prevents the leading rack 7 from moving toward the front side of the disk apparatus when external force such as impact is applied to the disk apparatus.

Referring to FIGS. 3 and 4, when the elevating rack 30 is further transported toward the rear side of the disk apparatus, the controlling boss 43 of the traverse unit 40 is in turn controlled by the TR controlling cam 32 on the elevating rack 30. This allows the traverse unit 40 to start to move upward the disk apparatus (a direction shown by arrow A4). The traverse unit 40 which is allowed by the TR chassis rotating spring to swing is linked by the right pressure lever spring 52 to the right pressure lever 50. The traverse unit 40 is first biased downward the loading chassis 200. After passing the neutral point, the traverse unit 40 is biased by the right pressure lever spring 52 upward the loading chassis 200. This state transition is shown in FIGS. 6E and 6F.

Preferably, the traverse unit 40 reaches the neutral point when the traverse unit 40 moves upward the disk apparatus and the cartridge positioning bosses 41 and 42 engage into the front and rear positioning holes 109 and 110 (FIG. 2) of the cartridge 105. This allows the right pressure lever 50 to be biased downward of the disk apparatus (a direction shown by arrow A5) after the cartridge 105 has been positioned. The right pressure lever 50 then pushes the cartridge 105 to the loading chassis 200, so that the disk within the cartridge 105 is chucked with the spindle motor 46. This timing can be set by the position of the hole in which the right pressure lever 52 is mounted.

When the elevating rack 30 is further transported toward the rear side of the disk apparatus, the traverse unit 40 is moved upward (the A4 direction) according to control by the bias force of the right pressure lever spring 52 and the TR controlling cam 32. The cartridge 105 comes to the play position and is sandwiched between the loading chassis 200 and the right pressure lever 50.

Referring to FIG. 16, when the elevating rack 30 is further transported toward the rear side of the disk apparatus, the spring pressure portion 36 of the elevating rack 30 presses one end of the left pressure lever spring 53 toward the rear side of the disk apparatus so that the left pressure lever 51 is moved toward the rear side of the disk apparatus. When the elevating rack is further transported toward the rear side of the disk apparatus, the left pressure lever spring 53 is biased to increase force. At the same time, the rack switch pressure portion 35 of the elevating rack 30 switches ON the loading completion detecting switch 152 when the state shown in FIG. 15 changes to the state shown in FIG. 16 to make the disk apparatus ready to play.

Here, the inside of the rectangular hole 37 of the elevating rack 30 is located in the vicinity of the end at the front side of the disk apparatus, of the switch rod 15 as shown in FIG. 14. Therefore, the switch rod 15 is not moved toward the front side of the disk apparatus by external force or the like, so that the insertion detecting switch 151 is not switched OFF accidentally.

Figure 21A:
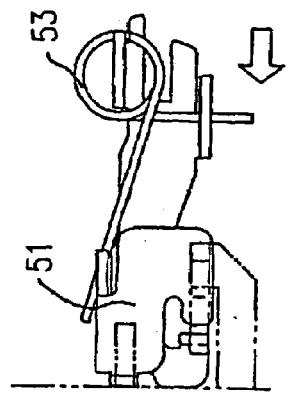
FIGS. 21A to 21D are diagrams for explaining operation of a left pressure lever of the disk apparatus according to the present invention.
Figure 21C:
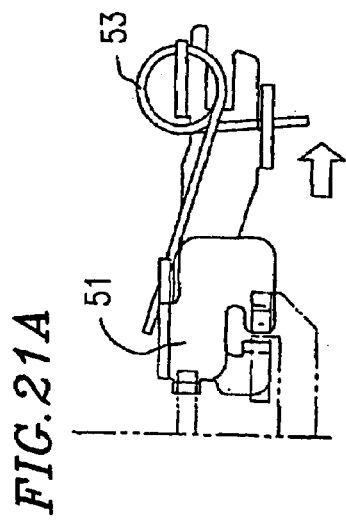
Figure 21B:
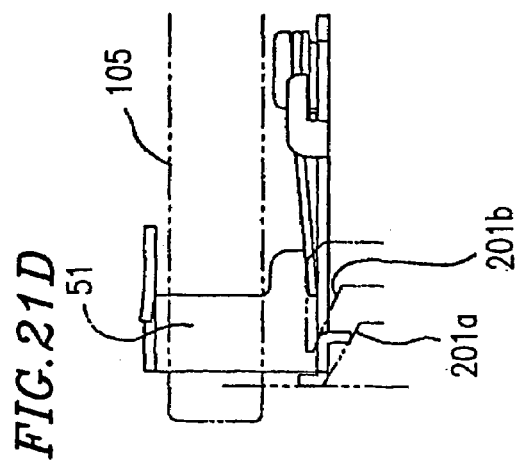
Figure 21D:
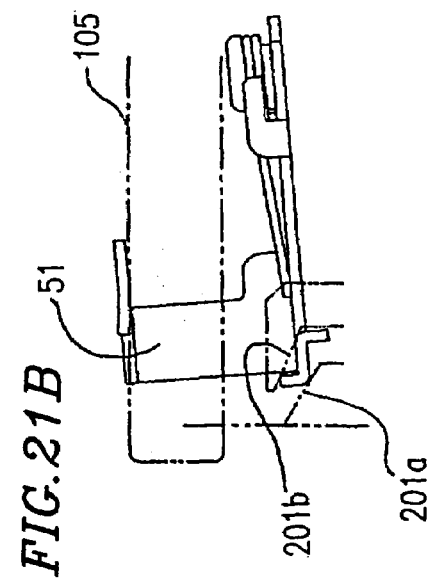

Referring to FIGS. 21A, 21B, 21C and 21D, the trajectory of the left pressure lever 51 is controlled by a pair of the left pressure lever cams 201a and 201b provided on the loading chassis 200. The portion at the front side of the disk apparatus, of the left pressure lever 51 is shown in FIGS. 21C and 21D, which is positioned upward the disk apparatus when there is a space between the cartridge 105 and the disk apparatus. The portion at the rear side of the disk apparatus, of the left pressure lever 51 is shown in FIGS. 21A and 21B, which is positioned downward of the disk apparatus when the cartridge 105 is pressed by the left passive lever 51 so that the left passive lever 51 is biased downward of the disk apparatus by the left pressure lever spring 53. The cartridge is thus pressed to the loading chassis 200.

Figure 22:
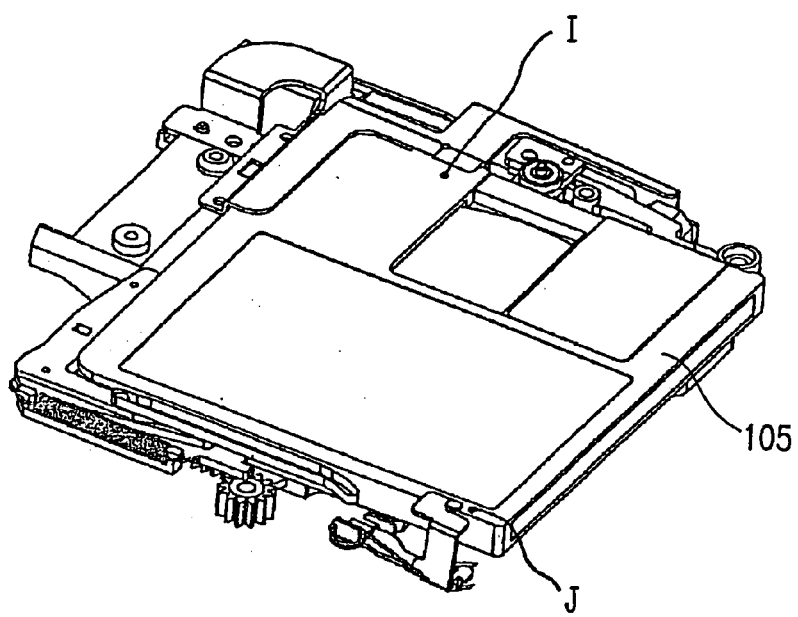
FIG. 22 is a perspective view illustrating a cartridge pressure portion of the disk apparatus according to the present invention.

FIG. 22 shows how the cartridge 105 is held in this case. As described above, in the loading operation, the cartridge 105 is horizontally positioned with a pair of the cartridge positioning bosses. Thereafter, downward pressure is given to points I and J shown in FIG. 22 in this order to address the wobble in the height direction. This order is preferable because one of the cartridge positioning bosses is located in the vicinity of point I.

The operation of the disk apparatus in playing a disk will be described below.

The disk apparatus is ready to play a disk after the cartridge 105 is completely loaded and the insertion detecting switch 151 is switched ON. When a play switch is switched ON, the spindle motor 40a shown in FIG. 6D starts to rotate. A pickup 45c is driven in an F direction and is positioned where to record or reproduce a signal on a disk-like recording medium. The signal is recorded or reproduced onto or from the disk using the pickup 45c.

As described in FIG. 6C, the pickup base 45a has the TR groove 45b formed on an end thereof. The TR groove 45b is engaged with the TR rail 400a on the traverse chassis 400 whose width is smaller than the width of the TR groove 45b. The pickup base 45a is biased downward of the disk apparatus by the slider pressure plate 46 fixed on the traverse chassis 400.

As described above, in the CLV mode, when the head writes or reads the signal onto or from the inner region of the disk, the rotation speed of the disk is relatively fast. When the head writes or reads the signal onto or from the outer region of the disk, the rotation speed of the disk is relatively slow. Therefore, it is considered that the disk rotation has more influence on the disk apparatus when writing or reading the signal onto or from the inner region of the disk than when onto or from the outer region. To solve this problem, the bias force by the slider pressure plate 46 pressing the pickup base 45a may be changed along the radial direction of the disk. This may be easily realized by changing the shape of the slider pressure plate 46.

As described above, variations in the bias force by the slider pressure plate 46 pressing the pickup base 45a along the radial direction of the disk can be easily realized by changing the shape of the slider pressure plate 46.

Figure 23B:
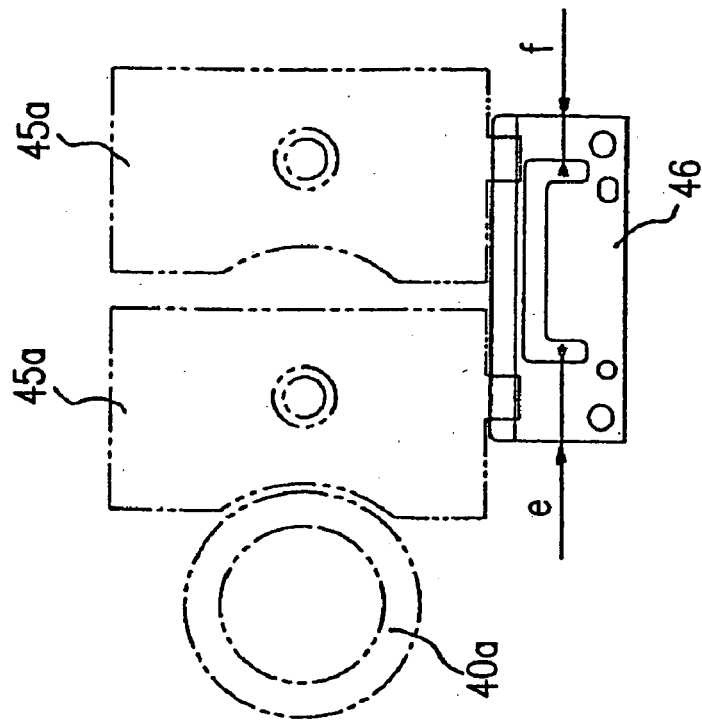
FIGS. 23A to 23B are plan views illustrating a shape of a slider pressure plate of the disk apparatus according to the present invention.
Figure 23A:
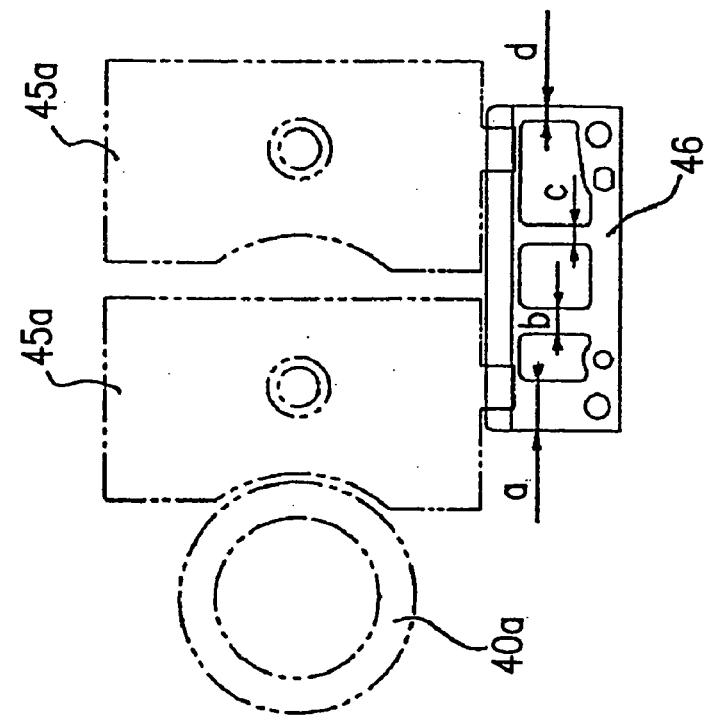

FIGS. 23A and 23B shows the shape of the slider pressure plate 46. Here, the pressure of the slider pressure plate 46 on the pickup base 45*a* is decreased as the pickup base 45*a* backs away from the spindle motor 40*a*. This can be easily realized by setting dimensions shown by a to f.

In another embodiment, the outer region of the disk has the slow rotation speed, but the degree of the disk wobbling is large. The pressure of the slider pressure plate 46 on the pickup base 45*a* may be preferably greater for the outer region of the disk than for the inner region.

In this case, referring to FIG. 16, the inner side of the rectangular hole 37 of the elevating rack 30 is located in the vicinity of the side at the front side of the disk apparatus, of the switch rod 15. Therefore, the switch rod 15 is not moved toward the front side of the disk apparatus by external impact or the like. The insertion detecting switch 151 also is not switched OFF accidentally by such force.

Referring to FIGS. 21A, 21B, 21C, and 21D, the left pressure lever 51 is controlled by a pair of the left pressure lever cams 201*a* and 201*b*, thereby obtaining an effect like driving a wedge. When the cartridge 105 is going to float upward, the frictional force between the left passive lever 51 and the cams prevents the floating movement. Therefore, appropriate pressure can be obtained with less spring loading.

The operation of the disk apparatus in removing the cartridge 105 will be described below.

Referring to FIG. 16, when a remove button is pressed, the rack transporting gear 85 is rotated in the direction opposite to that in loading and the elevating rack 30 is transported toward the front side of the disk apparatus. Then, the force charged in the biased left pressure lever spring 53 is released. The switch pressure portion 35 of the elevating rack 30 is then transported in the front side of the disk apparatus. The loading completion detecting switch 152 is switched OFF.

Referring to FIGS. 3 and 4, when the elevating rack 30 is further transported toward the front side of the disk apparatus, the controlling boss 43 is moved according to the TR controlling cam 32 downward of the disk apparatus (the A5 direction). The right pressure lever 50 reaches the neutral position of the right pressure lever spring 52 immediately after the engagement of the cartridge 105 with the cartridge positioning bosses 41 and 42 on the traverse unit 40 is released. The right pressure lever 50 is in turn biased upward the disk apparatus (the A4 direction), so that the downward bias force on the cartridge 105 (the A5 direction) is released.

In this case, referring to FIGS. 16 and 15, the engagement of the stopping cam 34 of the elevating rack 30 with the stopping arm boss 16*a* of the stopping arm 16 changes from the state shown in FIG. 16 to the state shown in FIG. 15. Accordingly, the engagement of the rack loading hook 71 on the leading rack 7 with the leading cam 16*b* is released as shown in FIG. 15. The leading rack 7 is allowed to move toward the front side of the disk apparatus.

Then the elevating rack 30 is further transported toward the front side of the disk apparatus, so that the rack driving boss 33 on the elevating rack 30 strikes the rack loading hook 71. The leading rack 7 is then transported toward the front side of the disk apparatus. Here, the gear portion 30A of the elevating rack 30 and the gear portion 7A of the leading rack 7 have the same phase. Thereafter, both the elevating rack 30 and the leading rack 7 are transported with the rack transporting gear 85 toward the front side of the disk apparatus. The cartridge 105 is transported by the leading rack 7 and then the leading arm 6 from the play position toward the front side of the disk apparatus.

In this case, referring to FIG. 20B, the closer hook 11 is engaged in the shutter closing hole 108. The cartridge 105 is transported, but the shutter member 106 is prevented from moving. Accordingly, the openings 123 and 122 are closed.

Referring to FIG. 14, when the elevating rack 30 is further transported toward the front side of the disk apparatus, the spring pressure portion 38 of the elevating rack 30 pushes one end of the left pressure lever spring 53 toward the front side of the disk apparatus. The left pressure lever 51 is then moved toward the front side of the disk apparatus. Here, the engagement of the gear portion 30A of the elevating rack 30 with the rack transporting gear 85 is released. Thereafter, only the leading rack 7 is transported by the rack transporting gear 85 toward the front side of the disk apparatus.

Here the stopping arm 16 is rotationally biased in the counterclockwise direction by reactive force of the resin spring portion formed at an end of the arm 16. The boss 16A provided at the other end is engaged in the stopping cam 34 of the elevating rack 30. The elevating rack 30 is then held at the position in which the boss 16A is engaged in or removed from the stopping cam 34.

The cartridge 105 is transported toward the front side of the disk apparatus by the leading rack 7 and then the leading arm 6. The engagement of the rotation controlling portion 13 on the shutter closer 1 with the cartridge 105 is released. Here the bend portion 21 of the shutter closer spring 2 still contacts and presses the cartridge 105 so that the closer hook 11 is still engaged in the shutter closing hole 108.

Referring to FIGS. 20A and 7B, when the leading rack 7 is further transported toward the front side of the disk apparatus, the contact of the shutter opener 3 with the lock member 125 (FIG. 2) is released immediately after the openings 123 and 122 of the cartridge 105 are closed. The lock arm 125C returns to the original position by its elasticity so that the shutter member 106 is locked again.

Next, the contact of the bend portion 21 of the shutter closer spring 2 with the cartridge 105 is released. The shutter closer 1 is rotated in the counterclockwise direction by the bias force so that the closer hook 11 is retracted outside the cartridge 105.

Note that when the contact of the bend portion 21 with the cartridge 105 is released, the contact state of the slope portion of the bend portion 21 with the round corner of the cartridge 105 is continuously changed as the cartridge 105 is transported. The shutter closer 1 is gradually rotated in the counterclockwise direction as the cartridge 105 is transported toward the front side of the disk apparatus. The closer hook 11 is retracted from the shutter closing hole 108 to outside the cartridge 105.

Referring to FIGS. 7A and 7B, when the openings 123 and 122 are completely closed, the degree of the engagement of the closer hook 11 with the shutter closing hole 108 depends on variation in the size of each member or difference in the shape of the corner of the cartridge 105. When the degree of the engagement is small, the cartridge 105 is smoothly transported toward the front side of the disk apparatus. Even when the degree of the engagement is great, since the closer hook 11 has the slope portion 12, the shutter closer spring 2 is bent and the shutter closer 1 is rotated in the counterclockwise direction as the cartridge 105 is transported toward the front side of the disk apparatus. The closer hook 11 is thus retracted from the shutter closing hole 108.

Referring to FIG. 13, when the leading rack 7 is further transported toward the front side of the disk apparatus, the cartridge 105 is also further transported by the leading arm 6 toward the front side of the disk apparatus. When the cartridge 105 is transported to the vicinity of the removal position, the leading arm 6 is rotationally controlled in the clockwise direction by the cam groove 91 and then the boss 63. In this case, as the rod driving portion 66 of the leading arm 6 is transported toward the front side of the disk apparatus, the rod driving portion 66 strikes the groove end 15a of the switch rod 15 as shown in FIGS. 11A and 11B. This allows the switch rod 15 to float toward the front side of the disk apparatus, so that the detecting switch 151 is returned toward the E direction and is then switched OFF.

Referring to FIG. 7B, the leading arm 6 is transported toward the front side of the disk apparatus while being rotated in the clockwise direction, so that a great amount of travel is added to the cartridge pushing portion 64 for removing the cartridge 105. Simultaneously, as shown in FIG. 7, the engagement of the leading hook 61 with the engagement portion 126 (FIG. 2) on the left side of the cartridge 105 is released. The cartridge 105 is further pushed with the cartridge pushing portion 64 so as to be positioned where to be removed from the disk apparatus.

Referring to FIG. 13, when the leading rack 7 has been transported to the removal position, a rack return regulating hook 72 on the leading rack 7 regulates the boss 33 on the elevating rack 30. This further secures the regulation of the elevating rack 30 which has been held by the stopping arm 16 during the drive, thereby preventing the elevating rack 30 from shifting into the engagement position by impact or vibration applied during transport or the standby state.

The operation of the disk apparatus in removing the cartridge 105, particularly of the shutter closer 11 shown in FIGS. 7A and 7B, will be described below.

Referring to FIG. 20B, when the remove button is pressed, the driving means (not shown) starts to transport the leading rack 7 toward the front side of the disk apparatus. The cartridge 105 is transported with the leading arm 6 from the play position toward the front side of the disk apparatus. Here, the closer hook 11 is engaged in the shutter closing hook 108 and the cartridge 105 is engages with the rotation controlling portion 13, so that the shutter closer 11 cannot rotate and thus the shutter member 106 is prevented from moving while allowing the cartridge 105 to be transported.

Referring to FIG. 20C, the cartridge 105 is then transported toward the front side of the disk apparatus when the engagement of the rotation controlling portion 13 on the shutter closer 1 with the cartridge 105 is released. Here, the bend portion 21 still contacts and presses the cartridge 105 and therefore the closer hook 11 is still engaged in the shutter closing hole 108.

Referring to FIG. 20A, when the cartridge 105 is further transported toward the front side of the disk apparatus, the contacting and pressing of the shutter opener 3 with the lock member 125 is released immediately after the openings 123 and 122 are completely closed. The lock arm portion returns to the original position by its own elastic force so that the shutter member 106 is locked again.

Referring to FIG. 7B, the contacting and pressing of the bend portion 21 of the shutter closer spring 2 and the cartridge 105 is then released. The shutter closer 1 is rotated by the bias force in the counterclockwise direction so that the closer hook 11 is retracted outside the cartridge 105.

Note that when the contacting and pressing of the bend portion 21 with the cartridge 105 is released, the contacting and pressing state of the slope portion of the bend portion 21 with the round corner of the cartridge 105 is continuously changed as the cartridge 105 is transported. The shutter closer 1 is gradually rotated in the counterclockwise direction as the cartridge 105 is transported toward the front side of the disk apparatus. The closer hook 11 is retracted from the shutter closing hole 108 to the outside of the cartridge 105.

When the openings 123 and 122 are completely closed, the degree of the engagement of the closer hook 11 with the shutter closing hole 108 varies depending on variation in the size of each member or difference in the shape of the corner of the cartridge 105. When the degree of the engagement is small, the cartridge 105 is smoothly transported toward the front side of the disk apparatus. Even when the degree of the engagement is great, since the closer hook 11 has the slope portion 12, the shutter closer spring 2 is bent and the shutter closer 1 is rotated in the counterclockwise direction as the cartridge 105 is transported toward the front side of the disk-apparatus. The closer hook 11 is thus retracted from the shutter closing hole 108.

Thereafter, referring to FIG. 7B, when the cartridge 105 is further transported by the leading arm 6 toward the front side of the disk apparatus up to the vicinity of the removal position, the leading arm 6 is rotationally controlled in the clockwise direction with the boss 63 in the cam groove 91. The engagement of the leading hook 61 with the engagement 126 on the left side of the cartridge 105 is then released and the cartridge 105 is pushed toward the front side of the disk apparatus by the cartridge pushing portion 64 so as to be positioned where to be removed from the disk apparatus.

EXAMPLE 2

Figure 24:
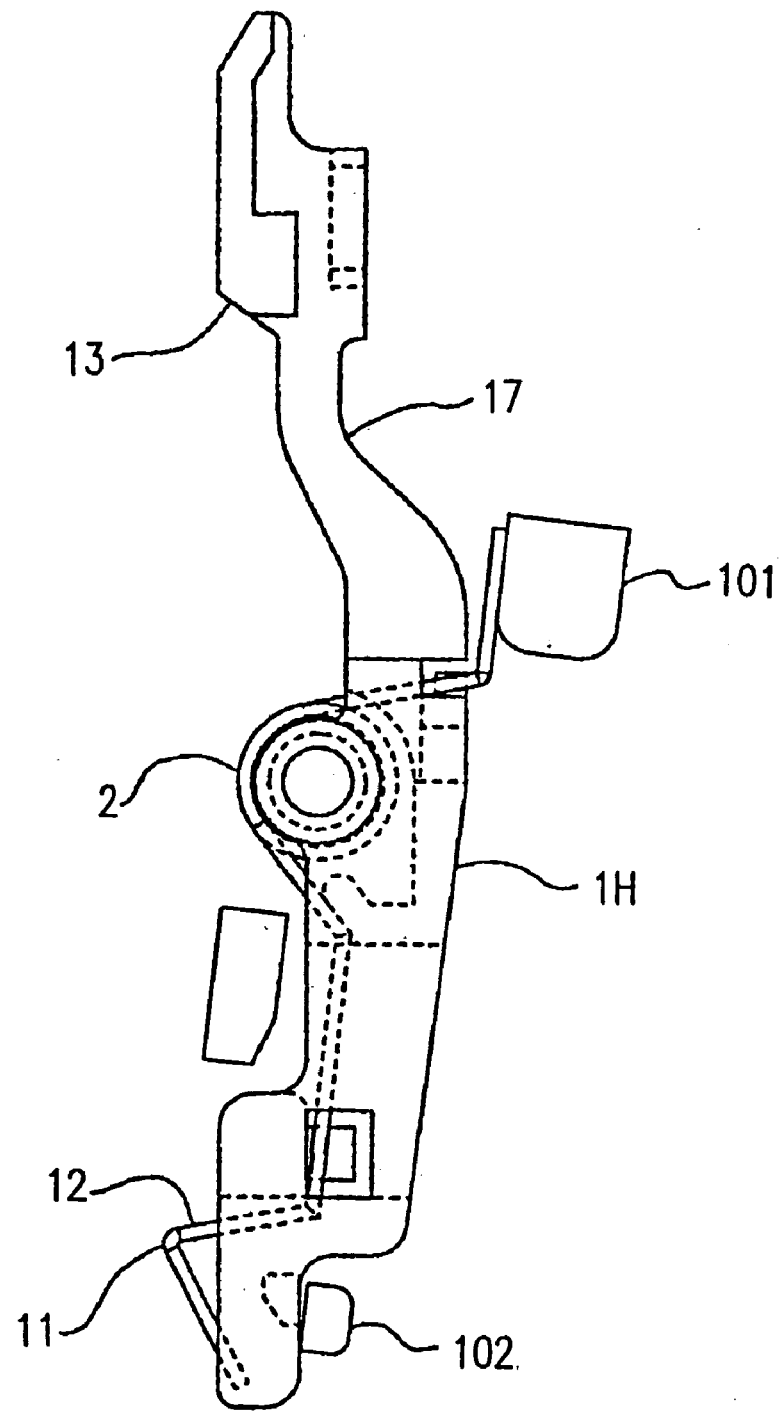
FIG. 24 is a plan view illustrating a configuration of another shutter closer according to the present invention.
Figure 25:
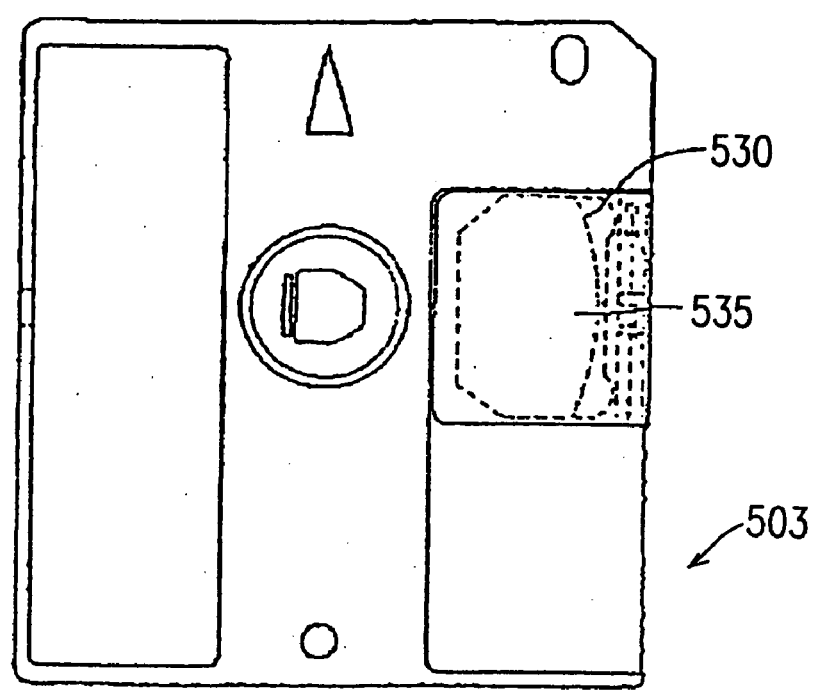
FIG. 25 is a plan view illustrating a cartridge in a conventional disk apparatus.
Figure 26:
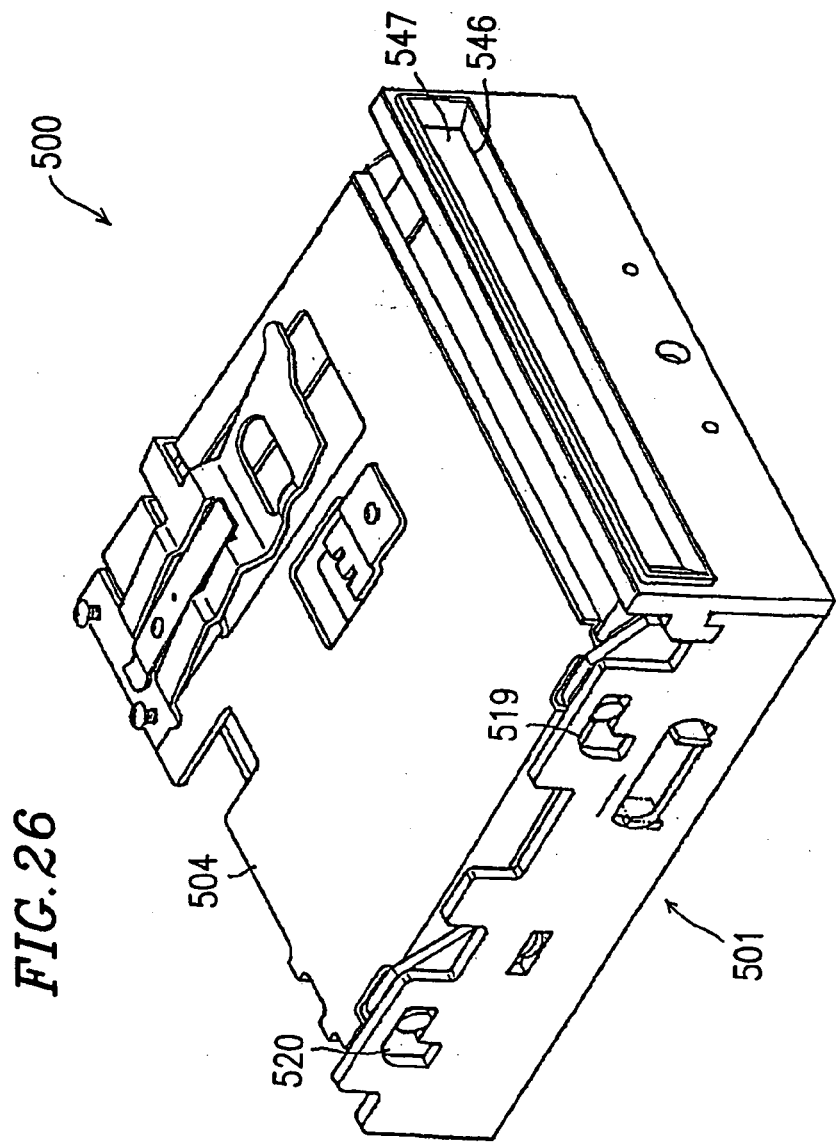
FIG. 26 is a perspective view illustrating a conventional disk apparatus.
Figure 27:
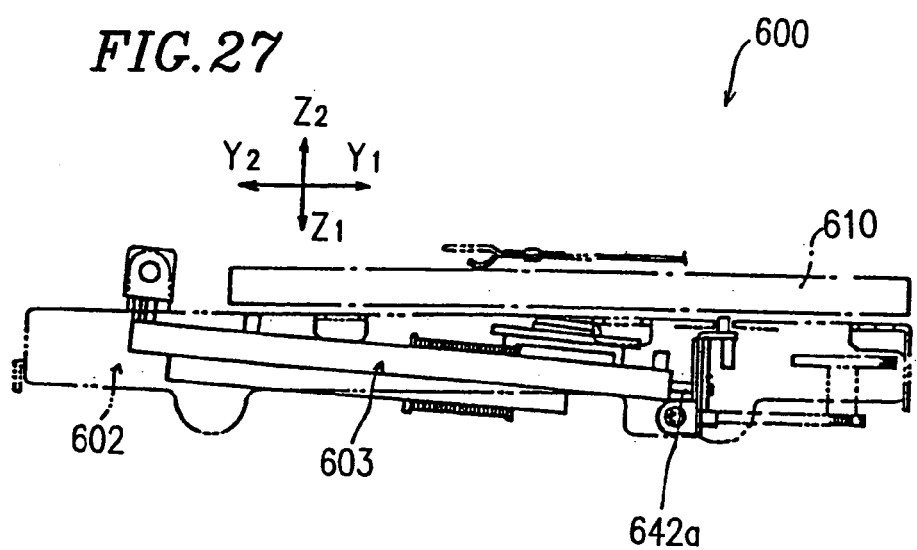
FIGS. 27 to 29 are elevation views illustrating other conventional disk apparatus.
Figure 28:
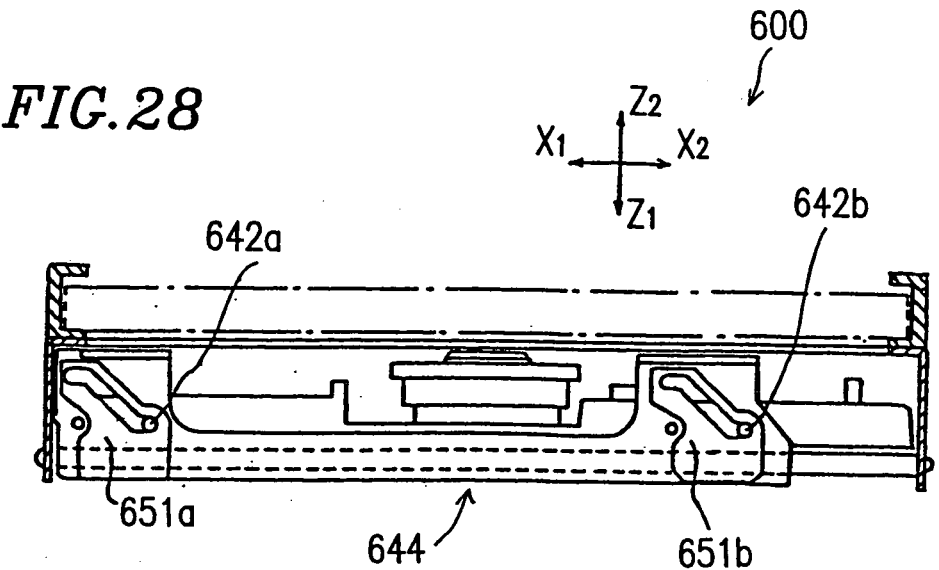
Figure 29:
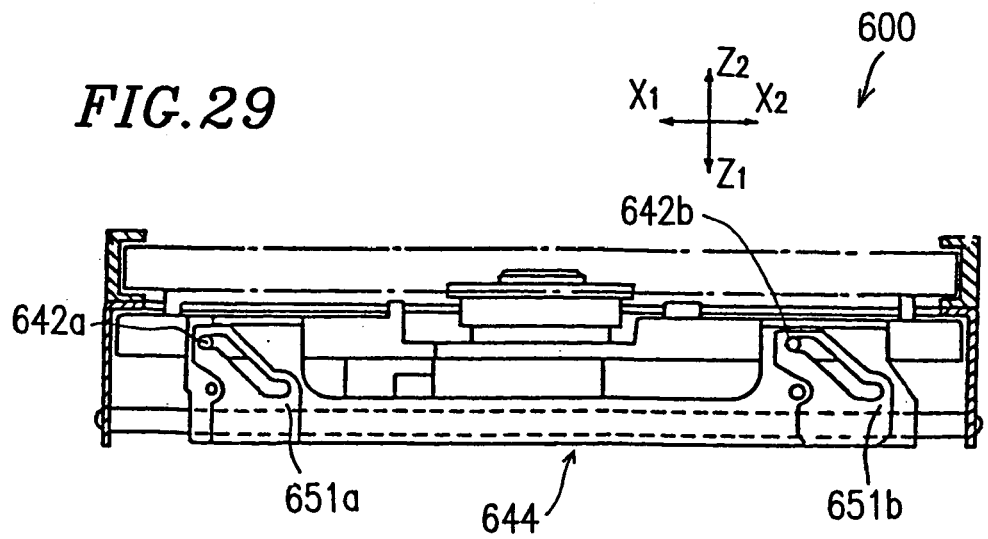
Figure 30:
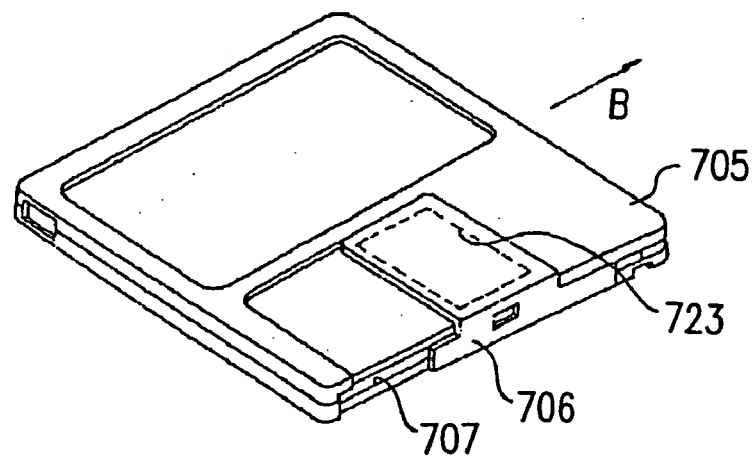
FIG. 30 is a perspective view illustrating a cartridge used in another conventional disk apparatus.
Figure 31:
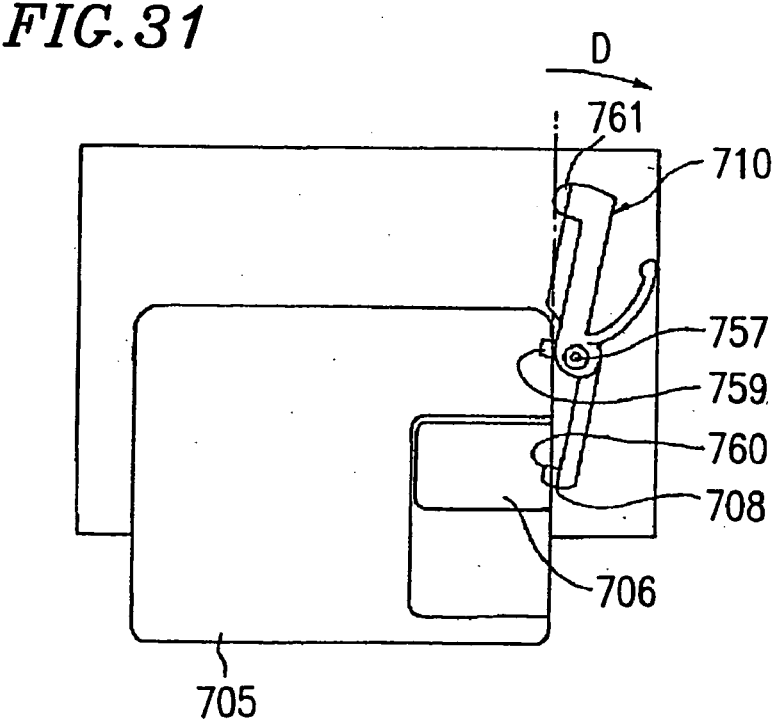
FIG. 31 is a plan view illustrating a state in which an inserted disk cartridge is operated by a shutter opening/closing arrangement of another conventional disk apparatus.
Figure 32:
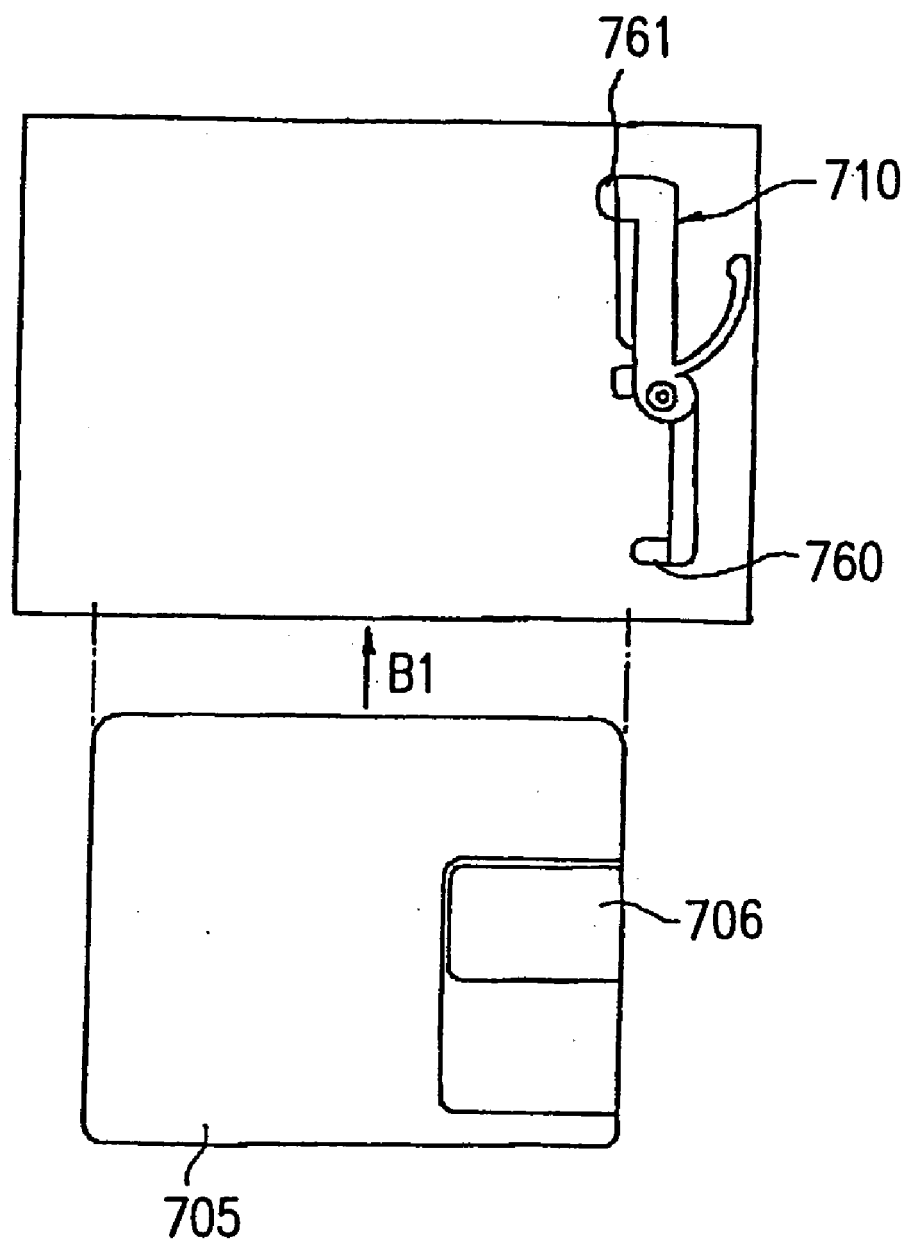
FIG. 32 is a plan view illustrating another shutter opening/closing arrangement of a conventional disk apparatus.

Another example of the shutter closer will be described. FIG. 24 is a plan view illustrating a configuration of a shutter closer 1H and a shutter closer spring 2 according to Example 2 of the present invention.

The difference from the shutter closer 1 described in Example 1 is that the closer 1H is a portion of the shutter closer spring 2 which is bent, and that the shutter closer spring 2 does not have the bend portion 21 as a second rotation controlling portion.

The shutter closer 1H will be described below.

Example 2 has the same operation as that in Example 1 until the shutter opener 3 releases the lock of the shutter member 106.

The cartridge 105 is further transported toward the rear side of the disk apparatus when the front end in the going direction of the cartridge 105 strikes the rotation controlling portion 13. The shutter closer 1H is then rotated in the clockwise direction against the bias force of the shutter closer spring 2. The closer hook 1 of the shutter closer 1H then strikes the shutter member 106. As the cartridge is further transported toward the rear side of the disk apparatus, the shutter closer 1H is further rotated in the clockwise direction so that the shutter closer spring 2 is elastically deformed. When the shutter closing hole 108 is moved to a position where to engage in the shutter closing hole 108, the closer hook 11 is engaged into the shutter closing hole 108.

The cartridge is further transported toward the rear side of the disk apparatus. Similar to Example 1, the bias force of the cartridge pressure portion 62 is applied to the left side of the cartridge 105 so that the cartridge 105 is guided by the first and second passive rollers 5 and 4 on the right side of the cartridge 105. This allows the cartridge 105 to be smoothly transported without undue load. When the cartridge 105 reaches the play position, the openings 123 and 122 are completely opened.

In the above-described inserting operation, when inserting the cartridge 105 in which the shutter member 106 is slightly opened by accident, i.e., the openings 122 and 123 are halfway opened, the closer hook 11 strikes the rotation controlling portion 13 without engaging in the shutter closing hole 108. In this case, since the shutter closer spring 2 is largely deformed, thereby avoiding breakage of the parts.

The operation in removing the cartridge 105 will be described below.

The operation in Example 2 is the same as that in Example 1 until when the cartridge 105 is transported toward the front side of the disk apparatus and the contacting and pressing of the rotation controlling portion 13 on the shutter closer 1 with the cartridge 105 is then released.

Here, the closer hook 11 on the shutter closer spring 2 is still engaged in the shutter closing hole 108. When the cartridge 105 is further transported toward the front side of the disk apparatus and the openings 123 and 122 are then completely closed, the shutter closing hole 108 is transported together with the cartridge 105 toward the front side of the disk apparatus. Since the closer hook 11 has the slope portion 12, the closer hook 11 is retracted from the shutter closing hole 108 while bending the shutter closer spring 2.

The contacting and pressing of the shutter opener 3 with the lock member 125 is released immediately after the openings 123 and 122 are completely closed. The shutter member 106 is locked again.

Thereafter, the cartridge 105 is further transported with the leading arm 6 toward the front side of the disk apparatus. When the cartridge reaches near the removal position, the leading arm 6 is rotationally controlled in the clockwise direction with the boss 63 in the cam groove 91. The engagement of the leading hook 61 and the engagement portion 126 of the left side of the cartridge is then released. The cartridge 105 is further pushed with the cartridge pushing portion 64 toward the front side of the disk apparatus to be positioned where to be removed from the disk apparatus.

As described above, in Example 2, the closer hook 11, which is engaged in the shutter closing hole 108 of the cartridge 105, is made of wire spring. Therefore, the closer hook 11 has excellent wear-resistance and sliding performance. The closer hook 11 also has sufficient strength against possible burrs and scars on the shutter member 106 made of metal or the like, so that substantially no damage occurs in the closer hook 11 which can maintain its performance.

INDUSTRIAL APPLICABILITY

According to the disk apparatus of the present invention, it is possible to obtain an arrangement for opening/closing the shutter of a disk cartridge which has a simple configuration, is less expensive and has a high level of reliability, and securely works against misoperation.

The disk apparatus of the present invention can be slimmed, although there are substantially no troubles in removing a disk cartridge which has a floating or peeling-off label. Since movement of the cartridge is simple, the disk apparatus has substantially no malfunction such as the failure of removing a disk. The disk apparatus securely works substantially without suffering from damages caused by user's misoperation or forced operation.

Moreover, it is possible to obtain an arrangement for opening/closing the shutter of a disk cartridge which has a simple configuration, is less expensive and has a high level of reliability, and securely works against misoperation.

The invention claimed is:

1. A disk apparatus, wherein a cartridge accommodating a disk-like recording medium and having an opening opened or closed by a shutter member is loaded to the disk apparatus, the disk apparatus comprising:
   a loading chassis;
   a cartridge transporting member provided on the loading chassis for transporting the cartridge from a removal position to a play position;
   a traverse unit for carrying a pickup for recording or reproducing a signal onto or from the disk-like recording medium;
   a traverse transporting member provided on the loading chassis for transporting the traverse unit from a standby position to the play position; and
   a driving section provided on the loading chassis for driving the cartridge transporting member and the traverse transporting member,
   the cartridge transporting member and the traverse transporting member can slide in a direction of transporting the cartridge;
   one of the cartridge transporting member and the traverse transporting member is disposed on the other;
   in loading the cartridge:
      the driving section starts to drive only the cartridge transporting member before the cartridge transporting member drives the traverse transporting member; and
      the cartridge reaches the play position before the driving section drives only the traverse transporting member;
   an engagement member, wherein in loading/removing the cartridge, when only one of the cartridge and traverse transporting members is driven by the driving section, the engagement member regulates movement of the other.

2. A disk apparatus wherein a cartridge accommodating a disk-like recording medium and having an opening opened or closed by a shutter member is loaded to the disk apparatus, the disk apparatus comprising:
   a loading chassis;
   a cartridge transporting member provided on the loading chassis for transporting the cartridge from a removal position to a play position;
   a traverse unit for carrying a pickup for recording or reproducing a signal onto or from the disk-like recording medium;
   a traverse transporting member provided on the loading chassis for transporting the traverse unit from a standby position to the play position; and
   a driving section provided on the loading chassis for driving the cartridge transporting member and the traverse transporting member,
   the cartridge transporting member and the traverse transporting member can slide in a direction of transporting the cartridge;
   one of the cartridge transporting member and the traverse transporting member is disposed on the other;
   in loading the cartridge:
      the driving section starts to drive only the cartridge transporting member before the cartridge transporting member drives the traverse transporting member; and the cartridge reaches the play position before the driving section drives only the traverse transporting member;

a biasing section for, in transporting the cartridge, biasing the cartridge in a direction substantially perpendicular to the direction of transporting the cartridge.

3. A disk apparatus according to claim 2, wherein the biasing section comprising:

a leading arm being substantially L-shaped; and an elastic body for linking the leading arm to the cartridge transporting member, the leading arm comprising:

a stopping hook portion provided on one end of the leading arm for engaging with a hole provided on a side of the cartridge;

a pushing portion provided on the other end of the leading arm for pushing the cartridge; and a boss portion for engaging with a cam groove provided on the leading chassis;

in transporting the cartridge, movement of the biasing section is controlled by the cam groove;

the stopping hook portion engages with the hole in such a manner as to prevent the cartridge from coming out of the disk apparatus; and at the end of the removal operation, the cam groove controls movement of the biasing portion in such a manner that the biasing portion is biased by the pushing portion to apply force to the cartridge toward the outside of the disk apparatus.

4. A disk apparatus according to claim 2, wherein the biasing section has U-shaped groove for engaging with the boss provided on the cartridge transverse member; and the biasing section is linked via an elastic member to the cartridge transverse member in such a manner as to apply bias force to the cartridge transporting member toward the front side of the disk apparatus.

5. A disk apparatus wherein a cartridge accommodating a disk-like recording medium and having an opening opened or closed by a shutter member is loaded to the disk apparatus, the disk apparatus comprising:

a loading chassis;

a cartridge transporting member provided on the loading chassis for transporting the cartridge from a removal position to a play position;

a traverse unit for carrying a pickup for recording or reproducing a signal onto or from the disk-like recording medium;

a traverse transporting member provided on the loading chassis for transporting the traverse unit from a standby position to the play position; and a driving section provided on the loading chassis for driving the cartridge transporting member and the traverse transporting member, the cartridge transporting member and the traverse transporting member can slide in a direction of transporting the cartridge;

one of the cartridge transporting member and the traverse transporting member is disposed on the other;

in loading the cartridge:

the driving section starts to drive only the cartridge transporting member before the cartridge transporting member drives the traverse transporting member; and the cartridge reaches the play position before the driving section drives only the traverse transporting member;

a plurality of roller members, wherein the plurality of roller members are provided on the trajectory of the outer side of the shutter member on the cartridge, and contact the outer circumference side of the cartridge, in such a manner as to be free to rotate, and in the cartridge transporting operation, guide the cartridge.

* * * * *